(12) United States Patent
Saffie-Siebert et al.

(10) Patent No.: US 12,465,592 B2
(45) Date of Patent: Nov. 11, 2025

(54) STRUCTURED ENCAPSULATED SILICON-CONTAINING PARTICLES

(71) Applicant: SISAF LIMITED, Guildford (GB)

(72) Inventors: Roghieh Suzanne Saffie-Siebert, Guildford (GB); Flavia Maria Sutera, Guildford (GB)

(73) Assignee: SISAF LIMITED, Guildford (GB)

( * ) Notice: Subject to any disclaimer, the term of this patent is extended or adjusted under 35 U.S.C. 154(b) by 1074 days.

(21) Appl. No.: 17/599,020

(22) PCT Filed: Mar. 30, 2020

(86) PCT No.: PCT/GB2020/050853
§ 371 (c)(1),
(2) Date: Sep. 28, 2021

(87) PCT Pub. No.: WO2020/193998
PCT Pub. Date: Oct. 1, 2020

(65) Prior Publication Data
US 2022/0184038 A1      Jun. 16, 2022

(30) Foreign Application Priority Data
Mar. 28, 2019 (GB) .................................. 19165904

(51) Int. Cl.
| | | |
|---|---|---|
| A61K 31/4174 | (2006.01) | |
| A61K 9/06 | (2006.01) | |
| A61K 9/48 | (2006.01) | |
| A61K 9/50 | (2006.01) | |
| A61K 31/343 | (2006.01) | |
| A61K 31/4196 | (2006.01) | |
| A61K 31/496 | (2006.01) | |
| A61K 47/10 | (2017.01) | |
| A61K 47/22 | (2006.01) | |
| A61K 47/26 | (2006.01) | |
| A61K 47/32 | (2006.01) | |
| A61K 47/38 | (2006.01) | |
| A61K 47/44 | (2017.01) | |
| A61P 31/10 | (2006.01) | |
| B01J 13/08 | (2006.01) | |

(52) U.S. Cl.
CPC ............ *A61K 31/4174* (2013.01); *A61K 9/06* (2013.01); *A61K 9/485* (2013.01); *A61K 9/4858* (2013.01); *A61K 9/5015* (2013.01); *A61K 31/343* (2013.01); *A61K 31/4196* (2013.01); *A61K 31/496* (2013.01); *A61K 47/10* (2013.01); *A61K 47/22* (2013.01); *A61K 47/26* (2013.01); *A61K 47/32* (2013.01); *A61K 47/38* (2013.01); *A61K 47/44* (2013.01); *A61P 31/10* (2018.01); *B01J 13/08* (2013.01)

(58) Field of Classification Search
None
See application file for complete search history.

(56) References Cited

U.S. PATENT DOCUMENTS

| | | |
|---|---|---|
| 5,922,360 A | 7/1999 | Bronder |
| 6,670,335 B2 | 12/2003 | Singh et al. |
| 8,992,984 B1 | 3/2015 | Brinker et al. |
| 9,603,801 B2 | 3/2017 | Barnett |
| 2007/0259013 A1 | 11/2007 | Avram et al. |
| 2009/0053268 A1 | 2/2009 | Depablo et al. |
| 2009/0208556 A1 | 8/2009 | Freeman |
| 2012/0128786 A1 | 5/2012 | Saffie-Siebert |
| 2014/0242016 A1* | 8/2014 | Binks .................. A61K 8/064 424/68 |
| 2016/0106091 A1 | 4/2016 | Meunier et al. |
| 2017/0007531 A1 | 1/2017 | Bastos et al. |

(Continued)

FOREIGN PATENT DOCUMENTS

| | | |
|---|---|---|
| AU | 774668 B2 | 4/2001 |
| CA | 3070107 | 1/2019 |
| CN | 104023711 A | 9/2014 |

(Continued)

OTHER PUBLICATIONS

Charoenputtakun et al. "Terpene Composited Lipid Nanoparticles for Enhanced Dermal Delivery of All-trans-Retinoic Acids" Biol. Pharm. Bull. 2014, 37, 1139-1148 (Year: 2014).*

(Continued)

*Primary Examiner* — Bethany P Barham
*Assistant Examiner* — Judith Marie Kamm
(74) *Attorney, Agent, or Firm* — Marian E. Fundytus; Amster Rothstein & Ebenstein LLP

(57) ABSTRACT

Encapsulated particles comprising one or more particle cores of silicon-containing material, wherein the one or more particle cores are encapsulated in a waxy lipid shell comprising: a) two lipidic components present at from 55% to 95% of the total encapsulated particle weight; b) a surfactant present at from 0.1% to 5% by weight of the total encapsulated particle weight; c) a co-surfactant present at from 0.01% to 1% by weight of the total encapsulated particle weight; d) a regulator of metastable state present at from 0.1% to 5% by weight of the total encapsulated particle, wherein the regulator of metastable state is selected from one or more of: the terpenes; the terpenoids; fatty acids, from myristic to docosanoic, pegylated by methyl ether of polyethylene glycol (PEG. Me M. W. 750-2000); diacylphosphatidylethanolamines pegylated with PEG; poloxamers (Pluronics); and derivatives thereof. Also related compositions and methods.

24 Claims, 6 Drawing Sheets

(56) References Cited

U.S. PATENT DOCUMENTS

| | | | |
|---|---|---|---|
| 2018/0296696 | A1 | 10/2018 | Ruoslahti |
| 2018/0344641 | A1* | 12/2018 | Brinker ............... A61P 35/02 |

FOREIGN PATENT DOCUMENTS

| | | | | |
|---|---|---|---|---|
| CN | 104127886 | | 11/2014 | |
| CN | 105434205 | A | 3/2016 | |
| CN | 106 177 982 | A | 12/2016 | |
| CN | 106265432 | A | 1/2017 | |
| CN | 107 616 952 | A | 1/2018 | |
| CN | 107 625 966 | A | 1/2018 | |
| CN | 107998264 | A | 5/2018 | |
| CN | 108552223 | A | 9/2018 | |
| CN | 101296625 | A | 10/2018 | |
| CN | 106806343 | A | 6/2019 | |
| EP | 0272091 | A2 * | 6/1988 | ............... A61K 9/50 |
| EP | 2030632 | A1 * | 3/2009 | ......... A61K 49/0067 |
| EP | 2459156 | | 11/2020 | |
| JP | 2006016390 | A | 1/2006 | |
| JP | 2011032194 | A | 2/2011 | |
| WO | WO9749375 | A1 | 12/1997 | |
| WO | WO 02/067998 | A1 | 9/2002 | |
| WO | WO 2004/016551 | A1 | 2/2004 | |
| WO | WO 2006/050221 | A2 | 5/2006 | |
| WO | WO 2007/012847 | A1 | 2/2007 | |
| WO | WO2009005963 | A2 | 1/2009 | |
| WO | WO 2010/038064 | | 4/2010 | |
| WO | WO 2011/001456 | | 1/2011 | |
| WO | WO 2011/012867 | | 2/2011 | |
| WO | WO 2013/056132 | | 4/2013 | |
| WO | WO 2014/165608 | | 10/2014 | |
| WO | WO 2017/008059 | A1 | 1/2017 | |
| WO | WO 2017/013250 | | 1/2017 | |
| WO | WO 2017/041032 | | 3/2017 | |
| WO | WO 2017/120537 | | 7/2017 | |
| WO | WO 2017/120537 | A1 | 7/2017 | |
| WO | WO 2017/181115 | A1 | 10/2017 | |
| WO | WO2018029247 | A1 | 2/2018 | |
| WO | WO 2018/134222 | | 7/2018 | |
| WO | WO 2019/028387 | | 2/2019 | |

OTHER PUBLICATIONS

Bnyan et al. "Surfactant Effects on Lipid-Based Vesicles Properties" Journal of Pharmaceutical Sciences 2018, 107, 1237-1246 (Year: 2018).*

Diljyot "Niosomes: A New Approach to Targeted Drug Delivery" Int. J. Pharm. Phytopharmacol. Res. 2012, 2(1), 53-59 (Year: 2012).*

Office Action issued in Chinese Application No. 202080023934.2 mailed Apr. 21, 2023, English Language translation thereof.

Technical Sheet for MERPOL OJ surfactant 9004-98-2; https://www.sigmaaldrich.com/us/en/product/aldrich; retrieved on Oct. 15, 2024.

International Search Report issued in International Application No. PCT/GB2020/050850, mailed Jul. 15, 2020.

Written Opinion of the International Searching Authority issued in International Application No. PCT/GB2020/050850, mailed Jul. 15, 2020.

Saffie-Siebert R et al., Drug Discovery World 2005; 6: 71-6.

Saffie-Siebert, R et al., Pharmaceutical Technology Europe, 17(4), 21-28 (2005).

Luo, D., Saltzman, W. M., Gene Therapy (2006) 13, 585-586.

Ahola, M., Kortesuo, P., Kangasniemi, I., Kiesvaara, J., Yli-Urpo, A., Int. J. Pharm. 195 (2000) 219 227.

Ahola. M., Säilynoja, E.S., Raitavuo, M.H., Vaahtio, M.H., Salonen, J.I., Yli-Urpo, A.U.O., Biomat. (2001), 15, 2163-2170.

Lu, J. , Liong, M., Zink, J., Tamanoi, F, Small. 2007, 3: 1341-1346.

Studies of the kinetics of the precipitation of uniform silica particles through the hydrolysis and condensation of silicon alkoxides, Journal of Colloid and Interface Science, vol. 142, Issue 1, Mar. 1, 1991, pp. 1-18 G.H Bogush and C.F Zukoski IV.

Communication Pursuant to Article 94 (3) EPC issued in counterpart application No. 20 718 723.8, mailed Jun. 29, 2022.

International Search Report issued in International Application No. PCT/GB2020/050849, mailed May 20, 2020.

Written Opinion of the International Searching Authority issued in International Application No. PCT/GB2020/050849, mailed May 20, 2020.

Juewen Liu et al: "Porous Nanoparticle Supported Lipid Bilayers (Protocells) as Delivery Vehicles", Journal of the American Chemical Society, vol. 131, No. 4, Feb. 4, 2009, pp. 1354-1355, XP055029872, ISSN:0002-7863,DOI: 10.1021.

Communication Pursuant to Article 94 (3) EPC issued in counterpart application No. 20 716 902.0, mailed Jul. 5, 2022.

International Search Report issued in International Application No. PCT/GB2020/050854, mailed Jul. 7, 2020.

Written Opinion of the International Searching Authority issued in International Application No. PCT/GB2020/050854, mailed Jul. 7, 2020.

Communication Pursuant to Article 94 (3) EPC issued in counterpart application No. 20 718 724.6, mailed Aug. 8, 2022.

Communication Pursuant to Article 94 (3) EPC issued in counterpart application No. 20 718 725.3, mailed Jun. 29, 2022.

Communication Pursuant to Article 94 (3) EPC issued in counterpart application No. 20 718 722.0, mailed Aug. 8, 2022.

U.S. Appl. No. 17/598,467, filed Sep. 27, 2021, published as US 2022-0183989 -A1.

U.S. Appl. No. 17/598,536, filed Sep. 27, 2021, published as US 2022-0174952 -A1.

U.S. Appl. No. 17/598,703, filed Sep. 27, 2021.

U.S. Appl. No. 17/598,595, filed Sep. 27, 2021, published as 2022-0151944 A1.

International Search Report issued in International Application No. PCT/GB2020/050851, mailed May 25, 2020.

Written Opinion of the International Searching Authority issued in International Application No. PCT/GB2020/050851, mailed May 25, 2020.

Lundstrom et al., Medicines, 2017, 4, 12.

Ramešová et al., Anal. Bioanal. Chem., 2016, 402, 975.

Office Action issued in JP Application No. 2021-557824 mailed Jan. 30, 2024, English Language translation thereof.

Office Action issued in counterpart Indian Application No. 202147045961 mailed Apr. 6, 2023.

Office Action issued in counterpart Chinese Application No. 202080025724.5 mailed Mar. 30, 2023, English Language translation thereof.

Yanan Liu, et al., "Effect of mesoporous silica nanoparticles on drug loading properties and drug release of flavonoids." Proprietary Chinese Medicines, Mar. 31, 2015, vol. 38, Issue 3, pp. 528-532.

V.V. Cotea et al., Mesoporous silica SBA-15, a new adsorbent for bioactive polyphenols from red wine Oct. 18, 2011, Analytica Chimica Acta, vol. 732, V.V., pp. 1-26.

Office Action issued in counterpart Chinese Application No. 202080025658.1 mailed Nov. 2, 2022 with English Language translation thereof.

Office Action issued in counterpart Chinese Application No. 202080025724.5 mailed Nov. 2, 2022 with English Language translation thereof.

Elizabeth A. Worrell, Aflaq Hamid, Karishma T. Mody, Neena Mitter and Hanu R. Pappu, "Nanotechnology for Plant Disease Management", Agronomy, 2018, 8, 285, 1-24. (Year: 2018).

Jasmina Kurepa, Timothy E. Shull and Jan A. Smalle, "Quercetin feeding protects plants against oxidative stress", F1000Research, 2016, 5:2430, 1-10. (Year: 2016).

Pan et al., Colloids and Surfaces B: Biointerfaces 159 (2017) 375-385.

Cheang, Tuck-yun, et al. "Promising plasmid DNA vector based on APTES-modified silicon nanoparticles." International journal of nanomedicine (2012): 1061-1067.).

Office Action issued in counterpart Chinese Application No. 202080025658.1 mailed Jun. 30, 2023, English Language translation thereof.

(56) References Cited

OTHER PUBLICATIONS

Examination Report issued in counterpart European Application No. 20 718 722.0 mailed Jul. 7, 2023.
Office Action issued in counterpart Chinese Application No. 202080025659.6 mailed Apr. 17, 2023, English Language translation thereof.
Office Action issued in counterpart Chinese Application No. 202080023934.2 mailed Apr. 21, 2023, English Language translation thereof.
Ruijin Zhao, et al. Beijing: Military Medical Science Press, "Oncology Health Education," Aug. 31, 2010, pp. 530-531.
Zhihua Wu, et al., Guangzhou: Guangdong Science and Technology Press, "Dermatologic Venereology: Textbook Edition,"' Jun. 30, 2013, p. 284.
Jinglong Cai, et al., Hangzhou: Zhejiang Science and Technology Publishing House, "Scar Plastic and Aesthetic Surgery"' Mar. 31, 2015, p. 786.
Roggers R.A. et al., Molecular Pharmaceutics, 2012, vol. 9 "Chemically Reducible Lipid Bilayer Coated Mesoporous Silica Nanoparticles Demonstrating Controlled Release and HeLa and Normal Mouse Liver Cell Biocompatibility and Cellular Internalization", pp. 2770-2777.
Liu D et al., Advanced functional materials, 2013, vol. 23 No. 15, "Nanostructured Porous Silicon-Solid Nanocomposite: Towards Enhanced Cytocompatibility and Stability, Reduced Cellular Association, and Prolonged Drug Release", pp. 1893-1902.
Examination report issued in GB Application No. GB1904336.3, mailed Aug. 1, 2019.
Examination report issued in GB Application No. GB1904334.8, mailed Aug. 12, 2019.
Examination report issued in GB Application No. GB1904337.1, mailed Aug. 1, 2019.
Examination report issued in GB Application No. GB1904338.9, mailed Aug. 8, 2019.
Extended European Search Report issued in Application No. 19165904.4, mailed Oct. 14, 2019.
Office Action issued in Chinese Application No. 202080024934.2 mailed Oct. 25, 2023, English Language translation thereof.
Pluskota A, "In Caenorhabditis elegans Nanoparticle-Bio-Interactions Become Transparent: Silica-Nanoparticles Induce Reproductive Senescenc." PLoS ONE | www.plosone.org;Aug. 2009 | vol. 4 | Issue 8 | e6622.
Model Biotoxicology Based on Summaries and Reflections on Hidradenitis elegans Research, Dayong Wang, et al., Nanjing: Southeast University Press, pp. 153, publication date: Jan. 31, 2013).
Office Action issued in Japanese Application No. JP 2021-557827 mailed Nov. 21, 2023, English Language translation thereof.
International Search Report issued in International Application No. PCT/GB2020/050853, mailed Jul. 10, 2020.
Written Opinion of the International Searching Authority issued in International Application No. PCT/GB2020/050853, mailed Jul. 10, 2020.
Xie W, Hu L. Mesoporous SBA-15 Silica-supported Diisopropylguanidine: an Efficient Solid Catalyst for Interesterification of Soybean Oil with Methyl Octanoate or Methyl Decanoate. J Oleo Sci. Oct. 1, 2016;65(10):803-813. Epub Sep. 15, 2016.

* cited by examiner

STRUCTURED ENCAPSULATED SILICON-CONTAINING PARTICLES

CROSS REFERENCE TO RELATED APPLICATIONS

The present application is a § 371 National Phase application based on PCT/GB2020/050853 filed Mar. 30, 2020, which claims the benefit of GB Application No. 19165904.4, filed Mar. 28, 2019 the subject matter of each of which is incorporated by reference in their entirety.

FIELD OF THE INVENTION

The invention relates to lipidic microspheres for encapsulating silicon-containing particles and to their uses.

BACKGROUND TO THE INVENTION

Silicon-containing particles are useful for a number of pharmaceutical and cosmetic purposes. For certain purposes it is useful to be able to encapsulate these particles in a waxy lipid shell. For example, the combination of a silicon-containing particle which has an ability to bind to hydrophilic compounds, and a waxy lipid shell provides both hydrophilic and hydrophobic environments which may be useful for providing compositions wherein hydrophilic ingredients are "locked up" in the waxy shell, or for providing compositions having both hydrophilic and hydrophobic environments, for example for combination products. For certain purposes such an encapsulated silicon-containing particles can be advantageous if it melts on contact with skin of another body surface.

Encapsulated particles of the present invention contain one or more particle cores of silicon-containing material. Such materials may be especially useful for delivering pharmaceutically active ingredients and particularly agents for dermal use.

SUMMARY OF THE INVENTION

According to a first aspect of the invention, there is provided encapsulated particles comprising one or more particle cores of silicon-containing material, wherein the one or more particle cores are encapsulated in a waxy lipid shell comprising:
a) two lipidic components together present at from 55% to 95% of the total encapsulated particle weight;
b) a surfactant present at from 0.1% to 5% by weight of the total encapsulated particle weight;
c) a co-surfactant present at from 0.01% to 1% of the total encapsulated particle weight;
d) a regulator of metastable state present at from 0.001% to 5% of the total encapsulated particle, wherein the regulator of metastable state is selected from one or more of: the terpenes; the terpenoids; fatty acids, from myristic to docosanoic, pegylated by methyl ether of polyethylene glycol (PEG. Me M. W. 750-2000); diacylphosphatidylethanolamines pegylated with PEG; poloxamers (Pluronics); and derivatives thereof.

According to a second aspect of the invention, there is provided a composition comprising encapsulated particles according to the first aspect of the invention, and one or more further ingredients.

According to a third aspect of the invention, there is provided a method of encapsulating particles of silicon-containing material comprising the steps of:

a) melting two or more waxy lipid substances together;
b) mixing the melted waxy lipid substances with particle cores of silicon-containing material;
c) adding to the mixture a warm aqueous solution containing, at least, water, a surfactant, a co-surfactant and a regulator of metastable state in order to obtain an emulsion; and
d) cooling the emulsion to a temperature below the melting point of the mixture of waxy lipid substances, wherein the regulator of metastable state is selected from one or more of: the terpenes; the terpenoids; fatty acids, from myristic to docosanoic, pegylated by methyl ether of polyethylene glycol (PEG. Me M. W. 750-2000); diacylphosphatidylethanolamines pegylated with PEG; poloxamers (Pluronics); and derivatives thereof.

According to a fourth aspect of the invention, there is provided encapsulated particles according to the first aspect of the invention or a composition according to a second aspect of the invention for use as a medicament.

According to a fifth aspect of the invention, there is provided a method of treating a medical condition comprising administering an effective dose of one or more active pharmaceutical ingredients (APIs) to a subject in need thereof, wherein the APIs are administered as a pharmaceutical composition according to an embodiment of the second aspect of the invention.

According to a sixth aspect of the invention there is provided a method of providing a cosmetic benefit to a subject comprising administering to said subject an encapsulated particle according to the first aspect of the invention or a composition according to the second aspect of the invention.

According to a seventh aspect of the invention, there is provided a method of inhibiting phase separation between a waxy lipidic phase of a pharmaceutical or cosmetic composition and an aqueous phase of said composition, comprising adding particles of silicon-containing material to the composition during manufacture and optionally further components selected from surfactants, co-surfactants and regulators of metastable state, wherein the regulators of metastable state may be selected from one or more of: the terpenes; the terpenoids; fatty acids, from myristic to docosanoic, pegylated by methyl ether of polyethylene glycol (PEG. Me M. W. 750-2000); diacylphosphatidylethanolamines pegylated with PEG; poloxamers (Pluronics); and derivatives thereof.

DESCRIPTION OF THE DRAWINGS

In FIG. 1 as originally prepared, the thermogram for 1-hexadecanol (labelled A) is shown in pale blue; that of the mixture of octadecyl heptanoate and octadecyl octanoate (labelled B) is shown in red; that of the silicon microparticles (labelled C) is shown in dark blue; and that of the microspheres (labelled D) is shown in black.

In FIG. 2 as originally prepared, the thermogram for P2 (labelled A) is shown in black; that of P5 (labelled B) is shown in green; and that of P10 (labelled C) is shown in pink.

In FIG. 3 as originally prepared, the release profile for P2 (labelled A) is shown in dark blue; that of P5 (labelled B) is shown in dark green; that of P10 (labelled C) is shown in dark orange; that of the 2 μm silicon microparticles (labelled D) is shown in light blue; that of the 5 μm silicon microparticles (labelled E) is shown in light green; and that of the 10 μm silicon microparticles (labelled F) is shown in light orange.

In FIG. 6 as originally prepared, the release profile of the 0019 cream (labelled A) is shown in orange, and the release profile of the control (labelled B) is shown in grey.

DETAILED DESCRIPTION OF THE INVENTION

Definitions

Figure 1:
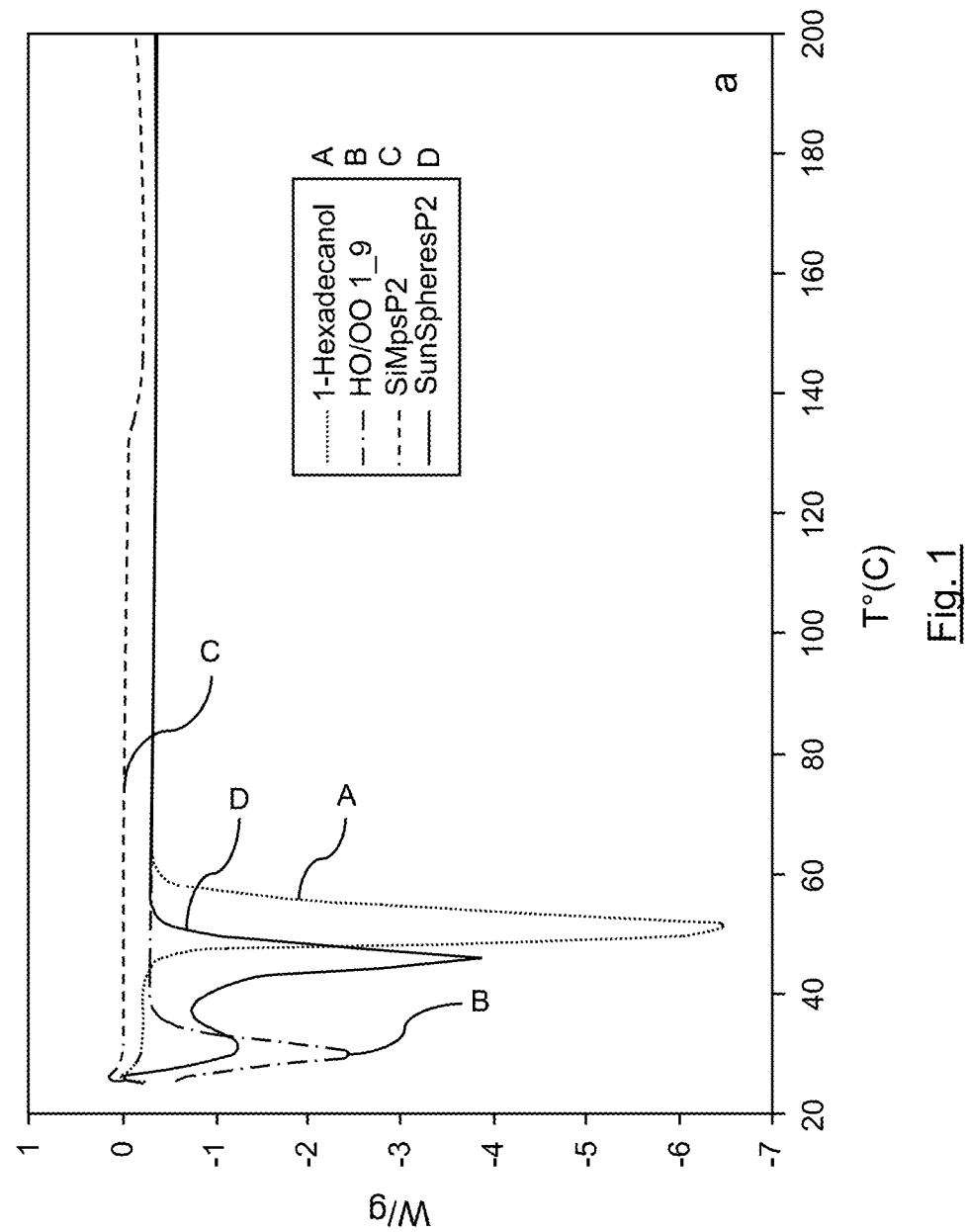
FIG. 1 shows thermograms (obtained by differential scanning calorimetry) for each of the individual components of microspheres prepared according to the present invention: 1-hexadecanol; a 1:9 mixture of octadecyl heptanoate:octadecyl octanoate; and silicon microparticles having a nominal diameter of 2 μm. The Figure also shows a thermogram for microspheres prepared according to the present invention (comprising 1-hexadecanol; a 1:9 mixture of octadecyl heptanoate:octadecyl octanoate; and silicon microparticles having a nominal diameter of 2 μm).

According to the present disclosure, a derivative of a compound may be a compound having substantially the same structure, but having one or more substitutions. For example, one or more chemical groups may be added, deleted, or substituted for another group. In certain preferred embodiments, the derivative retains at least part of a pharmaceutical or cosmetic activity of the compound from which it is derived, for example at least 90%, 80%, 70%, 60%, 50%, 40%, 30%, 20% or 10% of an activity of the compound from which it is derived. In some embodiments, the derivative may exhibit an increased pharmaceutical or cosmetic activity compared to the compound from which it is derived. For example, in the context of a peptide, a peptide derivative may encompass the peptide wherein one or more amino acid residues have been added, deleted or substituted for another amino acid residue. In the case of a substitution, the substitution may be a non-conservative substitution or a conservative substitution, preferably a conservative substitution.

In the context of the present disclosure, microspheres typically comprise particle cores of silicon-containing material enveloped or partially enveloped in a waxy lipid shell, the waxy lipid shell comprising two or more lipidic components. The microspheres preferably comprise further components such as one or more active pharmaceutical agents (APIs). Microspheres have a nominal diameter of from 50 to 500 μm, such as from 100 to 500, or 150 to 400 μm.

According to the present disclosure, a waxy lipid is a hydrophobic organic compound which is a malleable solid at room temperature (circa 25° C.). A waxy lipid has a melting point in a range of from 30 to 60° C., such as from 35 to 45° C., for example from 37 to 43° C. Waxy lipids are insoluble in water, but are soluble in organic non-polar solvents.

According to the present disclosure, the terpenes are a class of organic compounds. The chemical structure of a terpene compound comprises one or more isoprene units. For the avoidance of doubt, the terpenes form a class comprising, for example, the monoterpenes, the sesquiterpenes, the diterpenes, the tripeterpenes and the tetraterpenes. The terpenoids are a class of organic compounds derived from the terpenes. Typically, the chemical structure of a terpenoid is multicyclic and comprises one or more oxygen-containing functional groups. For the avoidance of doubt, the terpenoids form a class comprising, for example, the monoterpenoids, the sesquiterpenoids, the diterpenoids, the triterpenoids and the tetraterpenoids.

According to a first aspect of the invention, there is provided encapsulated particles comprising one or more particle cores of hydrolysable silicon-containing material, wherein the one or more particle cores are encapsulated in a waxy lipid shell comprising:
   a) two lipidic components together present at from 55% to 95% of the total encapsulated particle weight;
   b) a surfactant present at from 0.1% to 5% by of the total encapsulated particle weight;
   c) a co-surfactant present at from 0.01% to 1% of the total encapsulated particle weight;
   d) a regulator of metastable state present at from 0.001% to 5% by weight of the total encapsulated particle, wherein the regulator of metastable state is selected from one or more of: the terpenes; the terpenoids; fatty acids, from myristic to docosanoic, pegylated by methyl ether of polyethylene glycol (PEG. Me M. W. 750-2000); diacylphosphatidylethanolamines pegylated with PEG; poloxamers (Pluronics); and derivatives thereof.

Particle Cores

According to all aspects of the invention, the particle cores are made of a material comprising hydrolysable silicon. In certain preferred embodiments (for example, when the lipidic components are selected from amongst the fatty acid esters, such as stearyl heptanoate, stearyl caprylate, and derivatives thereof, and/or the regulator of metastable state comprises one or more terpenes, terpenoids, and derivatives thereof) the particle cores are nanoparticles having a nominal diameter of between 5 and 400 nm, for example 50 to 350 nm, for example 80 to 310 nm, for example 100 to 250 nm, for example 120 to 240 nm, for example 150 to 220 nm, for example about 200 nm. In certain preferred embodiments (for example, when the lipidic components are selected from amongst the fatty acid esters, such as stearyl heptanoate, stearyl caprylate, and derivatives thereof, and/or the regulator of metastable state comprises one or more terpenes, terpenoids, and derivatives thereof) the particle cores are microparticles having a nominal diameter of 1 to 100 μm, for example 1 to 50 μm, for example 1 to 25 μm, for example 1 to 15 μm. In any sample of particles there will be a certain amount of size and shape variation. The nominal diameter referred to above may refer to the mean diameter, and at least 90% of total particles in a sample of particle cores may fall within the size range specified. The particle cores are made of either pure silicon or a hydrolysable silicon-containing material. They are preferably porous. Silicon nanoparticles can be made porous by standard techniques such as contacting the particles with a hydrofluoric acid (HF)/ethanol mixture and applying a current. By varying the HF concentration and the current density and time of exposure, the density of pores and their size can be controlled and can be monitored by scanning electron micrography and/or nitrogen adsorption desorption volumetric isothermic measurement. In certain embodiments (for example, when the lipidic components are selected from amongst the fatty acid esters, such as stearyl heptanoate, stearyl caprylate, and derivatives thereof, and/or the regulator of metastable state comprises one or more terpenes, terpenoids, and derivatives thereof) when the particle cores are porous, their total surface area is preferably increased by virtue of their porosity by at least 50% or at least 100% over the surface area of a corresponding non-porous particle. In many circumstances porous particle cores will in reality have much greater increase in total surface area by virtue of their porosity.

The particle cores may be pure silicon or silicon-containing material. If they are not pure silicon, they preferably contain at least 50, 60, 70, 80, 90 or 95% silicon. In some embodiments (for example, when the lipidic components are selected from amongst the fatty acid esters, such as stearyl heptanoate, stearyl caprylate, and derivatives thereof, and/or the regulator of metastable state comprises one or more terpenes, terpenoids, and derivatives thereof) the particle cores comprise silica or elemental silicon or a mixture thereof.

The extent of surface oxidation of the particle cores and the distribution of Si—O bonds in their outer layer determines the colour of the particle cores. In certain preferred embodiments (for example, when the lipidic components are selected from amongst the fatty acid esters, such as stearyl heptanoate, stearyl caprylate, and derivatives thereof, and/or the regulator of metastable state comprises one or more terpenes, terpenoids, and derivatives thereof) the particle cores comprise white silicon. The silicon particle cores may be white silicon particle cores. The silicon particle cores may mostly comprise pure elemental silicon, whilst having a thin layer of oxidised silicon, such as a thin layer of silica, on their outer surface.

Preferably (for example, when the lipidic components are selected from amongst the fatty acid esters, such as stearyl heptanoate, stearyl caprylate, and derivatives thereof, and/or the regulator of metastable state comprises one or more terpenes, terpenoids, and derivatives thereof) the particle cores are present at from 0.2% to 50%, for example 1 to 50%, for example 2 to 50%, for example 5% to 20%, of the total weight of the encapsulated particles of the first aspect of the invention.

Lipidic Components

The lipidic components according to the first aspect of the invention preferably comprises two or more waxy lipid compounds. According to the third aspect of the invention, two or more waxy lipid substances are used. According to certain embodiments of all aspects of the invention (for example, when the particle cores are white silicon particle cores, and/or the regulator of metastable state comprises one or more terpenes, terpenoids, and derivatives thereof) the waxy lipid components are fatty acid esters, for example esters of stearyl alcohol, although esters of other fatty alcohols may be used, particularly alcohols of saturated fatty acids, for example esters of caprylic, decanoic, lauric, myristic, palmitic and oleic alcohol. Preferably, the fatty component of the esters is heptanoic acid or caprylic acid. According to preferred embodiments, the lipidic components may be selected from one or more member of the group consisting of esters of triacontanol and/or glyceryl monostearate with $C_8$ to $C_{22}$ acid chlorides, alcohols, such as octadecanoic (stearyl), decanoic (capric), dodecanoic (lauric), tetradecanoic (myristic), hexadecanoic (palmitic) and octadecanoic (stearic) acid chlorides, triglycerides such as, for example, trilaurin, tricapriloin, tristearin, tripalmitin; diglycerides such as for example dipalmitin and distearin; $C_{12}$ to $C_{22}$ fatty acids for example lauric acid, myristic acid, palmitic acid and stearic acid and their esters with polyalcohols such as the propylene glycol; alcohols such as ethanol, lauryl, myristic, cetyl, stearyl; cholesterol and its esters such as cholesterylpalmitate, cholesterylbutyrate and cholesterylbenzoate, phospholipids, sterols and cerebrosides, or natural and mineral waxes, not limited to, beeswax, spermaceti, carnauba wax, candelilla wax and ouricury wax.

The waxy lipidic components of the invention are preferably a mixture of stearyl heptanoate and stearyl caprylate. In certain preferred embodiments (for example, when the particle cores are white silicon particle cores, and/or the regulator of metastable state comprises one or more terpenes, terpenoids, and derivatives thereof) the ratio by weight of stearyl heptanoate:stearyl octanoate is in a range of from 1:1 to 1:50, such as from 1:1 to 1:20, from 1:5 to 1:15, or from 1:7 to 1:11. For example, this ratio may be 1:9. Preferably, the waxy lipidic components have emollient properties. Preferably, the waxy lipidic components are clinically safe and approved for use on human skin.

The lipidic components are preferably present at from 60% to 95% of the total weight of the encapsulated particles, for example from 65% to 95% or 70% to 95% or 75% to 95%.

When two or more lipidic components are provided in the encapsulated particles of the present invention, each lipidic component may be a compound which makes up at least 10, 20 or 30% of the total lipidic components by weight.

Surfactants and Co-Surfactants

A surfactant is a compound that lowers the interfacial tension between the lipidic components of the invention and an aqueous solution. Preferably, it is able to act as an emulsifier and assist in the formation of the encapsulated particles. A co-surfactant is a compound which enhances the effectiveness of a surfactant. Co-surfactants act by disrupting the stability of the liquid/liquid boundary established by the surfactant in order to enhance the properties of a surfactant, preferably by favouring the production of microemulsions versus emulsions of larger droplet size. In the encapsulated particles of the present invention, the surfactant and co-surfactant may be different compounds, although they may be related compounds, and they may have overlapping properties.

Surfactant

According to all aspects of the invention (for example, when the lipidic components are selected from amongst the fatty acid esters, such as stearyl heptanoate, stearyl caprylate, and derivatives thereof, and/or the regulator of metastable state comprises one or more terpenes, terpenoids, and derivatives thereof) the surfactant may be a phospholipid, a glycerophospholipid, a phosphosphingolipid, or an anionic, cationic, non-ionic or zwitterionic detergent or other suitable amphiphilic organic compound which shows the property of being absorbed at interfaces between lipid and aqueous environments. For example, the surfactant may be an alkylbenzenesulfonate, a quaternary ammonium compound or a polyoxyethylene compound. It may be a polyalkylene glycol ester or a glycoside such as octylthioglucoside or maltoside. According to certain preferred embodiments (for example, when the lipidic components are selected from amongst the fatty acid esters, such as stearyl heptanoate, stearyl caprylate, and derivatives thereof, and/or the regulator of metastable state comprises one or more terpenes, terpenoids, and derivatives thereof) the surfactant is selected from the group consisting of sodium cholate, sodium deoxycholate, sodium glycocholate, sodium taurocholate, sodium tauro-deoxycholate, lecithin and phospholipids and their hydrogenated forms, polysorbates (Tweens®), for example Tween-20, Tween-40, Tween-60, Tween-80 and Tween-85, sorbitans (Spans®) for example, Span-20, Span-40, Span-60 and Span-80, emulsifiers such as gelatin, lecithin (for example soy lecithin, egg lecithin or lyso lecithin), diacetyl tartaric acid esters of monoglycerides, sodium dodecyl sulphate (SDS), sodium bis (2-ethylhexyl) Sulphosuccinate, sodium deoxycholate, polyethylene glycol-8-caprylic acid, polyoxyethylene, polyoxyethylene-10-dodecyl ether, polyoxyethylene-10-oleylether, N,N-deimethyldodecylamine-N-oxide, N,N-dimethyloeylamine-N-oxide, alkyl polygycol ethers, p-tertalylphenylpolyoxyethleme ethere (Triton-X®), polyoxyethylated nonylphenol (Igepal®), hexadecyltrimethyl ammonium bromide, and mixtures of any thereof. In certain embodiments, the surfactant is 1-hexadecanol.

In preferred embodiments (for example, when the lipidic components are selected from amongst the fatty acid esters, such as stearyl heptanoate, stearyl caprylate, and derivatives thereof, and/or the regulator of metastable state comprises one or more terpenes, terpenoids, and derivatives thereof) the surfactant (for example, a non-ionic surfactant, such as Merpol OJ®; the surfactant may comprise one or more of: the cholate salts, lecithin, phospholipids and their hydrogenated forms, polysorbates, sorbitans, emulsifiers, and derivatives thereof) is present at from 0.1% to 4%, 0.2% to 4%, 0.5% to 5% or 1% to 4% by weight of the total encapsulated particle.

Co-Surfactant

According to all aspects of the invention, the co-surfactant is any compound which enhances the surfactant properties of the surfactant and in particular disrupts the stability of liquid/liquid boundaries established by the surfactant in order to favour the production of an emulsion having smaller droplet size than would have been produced if using the surfactant (for example, a non-ionic surfactant, such as Merpol OJ®; the surfactant may comprise one or more of: the cholate salts, lecithin, phospholipids and their hydrogenated forms, polysorbates, sorbitans, emulsifiers, and derivatives thereof) alone.

According to certain embodiments (for example, when the lipidic components are selected from amongst the fatty acid esters, such as stearyl heptanoate, stearyl caprylate, and derivatives thereof, and/or the regulator of metastable state comprises one or more terpenes, terpenoids, and derivatives thereof) the co-surfactant is a compound selected from the group consisting of bile salts such as sodium taurocholate, alcohols and glycols having low molecular weight such as for example butanol, sec-butanol, isobutanol, tert-butanol, pentanol, heptanol, octanol, sorbitol, 1-decanol, ethanol, propanol, isopropanol, hexanediol, propylene glycol and hexanol, fatty acids with a low molecular weight such as butyric acid, caproic acid, pentanoic acid, hexanoic acid, ethanoic acid, esters of phosphoric acid and benzyl alcohol, n-butylamine, n-pentylamine, n-hexylamine, sec-butylamine, tert-butylamine, 2-aminopentane, 3-aminopentane, 1,2-butanediol, 1,2-pentanediol, 1,2-hexanediol, propylene glycol, Cremophor RH40 (polyoxyl 40 hydrogenated castor oil, Plurol oleique (polyglyceryl-6-dioleate), Plurol isostearique (isostearic acid of polyglycerol), poloxamer, polyoxythylene-10-oleyl ether, sodium monohexyl phosphate, sodium monooctyl phosphate, N,N-dimethyl dodecylamine-N-oxide, N,N-dimethyl octylamine-N-oxide, cinnamic alcohol, cinnamic aldehyde, and mixtures of any thereof.

In certain embodiments (for example, when the lipidic components are selected from amongst the fatty acid esters, such as stearyl heptanoate, stearyl caprylate, and derivatives thereof, and/or the regulator of metastable state comprises one or more terpenes, terpenoids, and derivatives thereof) the co-surfactant is present at from 0.1% to 1.0% by weight of the total encapsulated particle, for example from 0.2% to 0.5%, or from 0.1% to 0.5%.

Regulator of Metastable State

A metastable state of a substance or mixture is a stable state of a substance which is a higher energy state than the substance or mixture's most stable state. The substance or mixture appears to have no tendency to change, although it is not at a final equilibrium. The lipidic components according to all aspects of the invention (which will be a mixture of two or more lipid compounds, for example a mixture comprising one or more of stearyl heptanoate, stearyl caprylate, and derivatives thereof) will tend to spontaneously organize to a low energy, closely packed state. Since the lipidic components consist of two or more lipidic compounds, they may tend to separate from each other. A regulator of metastable state acts to slow the shift away from a metastable state by promoting the maintenance of metastable mixtures of lipidic compounds and inhibiting their separation from each other. If, as is preferred, the lipidic components of the invention are solid at room temperature and melt when topically applied to a body surface, the regulator of metastable state ensures that the mixture of lipidic components has a "sharp" melting point, even if it consists of two or more compounds showing different melting points. If the lipidic component of a substance related to the invention is used in such a way that it contains a lipophilic pharmaceutically or cosmetically active compound (for example, Miconazole) the presence of a regulator of metastable state (for example, a regulator of metastable state selected from one or more terpenes, terpenoids and derivatives thereof) may assist in prolonging the shelf life of the pharmaceutical or cosmetically active substance. In preferred embodiments (for example, when the lipidic components are selected from amongst the fatty acid esters, such as stearyl heptanoate, stearyl caprylate, and derivatives thereof, and/or the particle cores comprise white silicon) the regulator of metastable state is preferably a compound selected from the group consisting of terpenes and terpenoids. For example, the regulator of metastable state may comprise one or more hemiterpenes and related oxygen-containing derivatives such as prenol and isovaleric acid; one or more monoterpenes including geraniol, terpineol, limonene, myrcene, linalool, pinene (and derivatives as iridoids); one or more sesquiterpenes as farnesenes, farnesol and humulene; one or more diterpenes as cafestol, kahweol, cembrene and taxadiene, retinol, retinal, and phytol; one or more triterpenes and tetraterpenes and their derivatives thereof. The regulator of metastable state may comprise one or more of dipalmitoyl phosphatidylethanolamine-PEG, the PEG-stearates, and the fatty acids, from myristic to docosanoic, pegylated with methyl ether of polyethylene glycol (PEG. Me M. W. 750-2000), diacylphosphatidylethanolamines pegylated with PEG or poloxamers (Pluronics 0), which are block copolymers based on ethylene oxide and propylene oxide and mixtures of any thereof.

In particularly preferred embodiments (for example, when the lipidic components are selected from amongst the fatty acid esters, such as stearyl heptanoate, stearyl caprylate, and derivatives thereof, and/or the particle cores comprise white silicon) the regulator of metastable state is a terpene, such as a monoterpene, for example limonene. The regulator of metastable state is present according to all aspects of the invention at from 0.1% to 5% by weight of the total encapsulated particle. For example, from 0.1% to 4%, from 0.2% to 4% or from 0.5% to 3%.

Silicon as Reaction Catalyst for Producing Structured Lipid Particles

Hydrogenation and interesterification are the main technological approaches employed for the modification of lipid compounds and vegetable oils, especially terpenes, to provide special functions for certain food and pharmaceutical applications, by varying the composition and/or spatial distribution of fatty acids (FAs) and modifying the physicochemical properties of the resulting material.

Recently, structured lipids (SLs) containing medium chain fatty acids (MCFAs) have been attracting much attention, since they are absorbed more efficiently and rapidly by the human body. Such SLs are characterized by a interesterification process that does not produce trans FAs and affect the degree of saturation. By using the catalytic interesterification-like process in presence of Silica substrate, SLs are produced through changing the FA profiles and/or the positional distribution of FAs in the alcohol backbone so as to improve the physical and nutritional qualities.

Homogeneous base catalysts, for instance sodium hydroxide and sodium alkoxide, are commonly utilized for interesterification reactions. Although these liquid catalysts are relatively inexpensive and readily available, technological problems, including difficult separation of the catalysts, and non-reusability, are usually encountered. So far, a variety of heterogeneous base catalysts, i.e. supported alkali or alkaline earth metal oxides, basic zeolites, hydrotalcites, zeolites, and ion-exchange resins, have been explored for various organic reactions. in particular, the immobilization of organic base catalysts on solid supports such as silica has gained increasing attention as a new generation of heterogeneous catalyst. [Xie W, Hu L. Mesoporous SBA-15 Silica-supported Diisopropylguanidine: an Efficient Solid Catalyst for Interesterification of Soybean Oil with Methyl Octanoate or Methyl Decanoate. J Oleo Sci. 2016 Oct. 1; 65(10):803-813. Epub 2016 Sep. 15.]

However, very little research has been carried out on utilizing heterogeneous base catalysts for interesterification in the production of structured lipid particles using silicon nanoparticles.

Control of the stabilization/destabilization of structured lipid bilayers on nanoparticles is important for the promotion of their organized assembly and for their use as delivery vehicles.

Properties of Encapsulation

According to all aspects of the invention, the particle cores of silicon-containing material are encapsulated in a waxy lipid shell (for example, a waxy lipid shell comprising lipidic components selected from amongst the fatty acid esters, such as stearyl heptanoate, stearyl caprylate, and derivatives thereof). Encapsulated particles preferably constitute a powder. The powder preferably comprises approximately spherical particles having their average diameter of between 30 and 550 microns. For example, at least 90% of the particles may have their largest dimension as between 50 and 500 microns (or 100 and 500 microns or 150 and 400 microns). Since the encapsulated particles of the invention are significantly larger than the particle cores, multiple particle cores (for example, particle cores comprising white silicon) will typically be encapsulated together in a single waxy lipid shell (for example, a waxy lipid shell comprising lipidic components selected from amongst the fatty acid esters, such as stearyl heptanoate, stearyl caprylate, and derivatives thereof) in accordance with all aspects of the invention.

In some embodiments, all of the particle cores of silicon-containing material are fully enveloped in a waxy lipid shell. In other embodiments, some of the particle cores of silicon-containing material are fully enveloped in a waxy lipid shell. In certain embodiments, some of the particle cores of silicon-containing material are partially enveloped in a waxy lipid shell. In some embodiments, some of the particle cores are partially embedded in a waxy lipid globule. In some embodiments, some of the particle cores are adhered to the surface of a waxy lipid globule. For example, in some embodiments, particle cores having a nominal diameter of from 1 to 6 μm, such as particles having a nominal diameter of from 1 to 3 μm, may be adhered to the surface of a waxy lipid globule. In some embodiments, such particle cores may be partially embedded in a waxy lipid globule. In some embodiments, such particle cores may be partially enveloped in a waxy lipid shell.

In certain preferred embodiments (for example, when the waxy lipid shell comprises lipidic components selected from amongst the fatty acid esters, such as stearyl heptanoate, stearyl caprylate, and derivatives thereof) the waxy lipid shell has a melting point of between 25° C. and 65° C., for example between 28° C. and 52° C., for example between 30° C. and 45° C. The melting point is preferably such that it will melt on skin contact.

Further Components

The encapsulated particles of the invention (for example, encapsulated particles wherein the lipidic components are selected from amongst the fatty acid esters, such as stearyl heptanoate, stearyl caprylate, and derivatives thereof, and/or the regulator of metastable state is selected from one or more terpenes, terpenoids, and derivatives thereof) preferably further comprise one or more active pharmaceutical ingredients (API), for example at up to 0.1%, 0.5%, 1%, 2%, 4%, 6%, 8% or 10% by weight of the total encapsulated particle may comprise each API (for example, Miconazole) present.

The API may be hydrophilic, in which case it is preferably located in association with the particle cores and substantially absent from the waxy lipid shell (for example less than 10% by weight of the API is in the waxy lipid shell).

Alternatively, the API may be lipophilic and substantially present (for example at least 90% of total by weight) in the waxy lipid shell. For example, the API may be Miconazole.

In certain embodiments (for example, when the lipidic components are selected from amongst the fatty acid esters, such as stearyl heptanoate, stearyl caprylate, and derivatives thereof, and/or the regulator of metastable state is selected from one or more terpenes, terpenoids, and derivatives thereof) the encapsulated particles may comprise a first and second API, wherein one API is hydrophilic and substantially located in association with the particle core, and one API is lipophilic and substantially associated with the waxy lipid shell.

According to certain embodiments (for example, when the lipidic components are selected from amongst the fatty acid esters, such as stearyl heptanoate, stearyl caprylate, and derivatives thereof, and/or the regulator of metastable state is selected from one or more terpenes, terpenoids, and derivatives thereof) the API or APIs may be selected from:

- nonsteroidal anti-inflammatory drugs such as, but not limited to, Aceclofenac, Diclofenac, Celecoxib, choline and magnesium salicylates, Ibuprofen, Naproxen, Piroxicam (NSAID category);
- anti-inflammatory and immunosuppressive agents such as but not limited to hydrocortisone and related derivatives, and corticosteroids for example prednisone and dexamethasone; and steroids;
- analgesics and antipyretics, such as but not limited to, Acetaminophen, and acetylsalicylic acid;
- anti-fungal actives, such as but not limited to Griseofulvin, Miconazole, Fluconazole, Itraconazole, Oxiconazole, Econazole, Bifonazole as free base and related salts, for example as nitrate salts (anti-fungal category);
- antiviral and anti-parasitic drugs such as, but not limited to, Acyclovir, Ganciclovir, Valacyclovir, Metronidazole and Tinidazole, Amphotericin (antiviral/anti-parasite category);
- antibiotics such as, but not limited to, Gentamicin, Nystatin, Clindamycin;
- Anticancer drug and or adjuvants for anticancer therapy such as, but not limited to, Taxol, Methotrexate, curcumin, Aloe-emodin;
- anaesthetics (liquid forms);
- non-depolarising muscle relaxants;
- opioid analgesics;
- cannabinoids and benzodiazepines;
- antiepileptic drugs;
- peptides and aminoacids;
- hormones.
- fatty waxes with specific cosmeceutical properties.

In certain preferred embodiments (for example, when the lipidic components are selected from amongst the fatty acid esters, such as stearyl heptanoate, stearyl caprylate, and derivatives thereof, and/or the regulator of metastable state is selected from one or more terpenes, terpenoids, and derivatives thereof) the API is Miconazole.

In other embodiments (for example, when the lipidic components are selected from amongst the fatty acid esters, such as stearyl heptanoate, stearyl caprylate, and derivatives thereof, and/or the regulator of metastable state is selected from one or more terpenes, terpenoids, and derivatives thereof) the encapsulated particles of the invention preferably further comprise one or more active cosmetic ingredients (ACIs), for example at up to 0.1%, 0.5%, 1%, 2%, 4%, 6%, 8% or 10% by weight of the total encapsulated particle may comprise each ACI present.

The ACI may be hydrophilic, in which case it is preferably located in association with the particle cores and substantially absent from the waxy lipid shell (for example less than 10% by weight of the ACI is in the waxy lipid shell).

Alternatively, the ACI may be lipophilic and substantially present (for example at least 90% of total by weight) in the waxy lipid shell.

In certain embodiments (for example, when the lipidic components are selected from amongst the fatty acid esters, such as stearyl heptanoate, stearyl caprylate, and derivatives thereof, and/or the regulator of metastable state is selected from one or more terpenes, terpenoids, and derivatives thereof) the encapsulated particles may comprise a first and second ACI, wherein one ACI is hydrophilic and substantially located in association with the particle core, and one ACI is lipophilic and substantially associated with the waxy lipid shell.

In certain embodiments (for example, when the lipidic components are selected from amongst the fatty acid esters, such as stearyl heptanoate, stearyl caprylate, and derivatives thereof, and/or the regulator of metastable state is selected from one or more terpenes, terpenoids, and derivatives thereof) the encapsulated particles comprise both an API and an ACI, wherein one API/ACI is hydrophilic and substantially located in association with the particle core, and the other API/ACI is lipophilic and substantially associated with the waxy lipid shell.

According to certain embodiments (for example, when the lipidic components are selected from amongst the fatty acid esters, such as stearyl heptanoate, stearyl caprylate, and derivatives thereof, and/or the regulator of metastable state is selected from one or more terpenes, terpenoids, and derivatives thereof) the ACI or ACIs may be selected from:

- glycyrrhizin acid (AKA Liquorice extract), Kojic acid or more generally whitening agents for skin products;
- antioxidants (as plant extracts, for example Lupinus a/bus extract) and vitamins;
- copper peptide (6-Amino-2-[[2-[(2-aminoacetyl)amino]-3-(1H-imidazol-5-yl)propanoyl]amino]hexanoic acid, with or without copper ions);
- alpha-hydroxy acids;
- beta-hydroxy acids;
- hydroquinone;
- retinol;
- L-ascorbic acid;
- hyaluronic acid;
- fatty waxes with specific cosmeceuticals properties.

While it is possible for the encapsulated particles of the present invention to be administered alone, it is preferable for them to be present in a pharmaceutical or cosmetic composition.

Accordingly, the second aspect of the invention provides a composition comprising encapsulated particles according to the first aspect of the invention (for example, encapsulated particles wherein the lipidic components are selected from amongst the fatty acid esters, such as stearyl heptanoate, stearyl caprylate, and derivatives thereof, and/or the regulator of metastable state is selected from one or more terpenes, terpenoids, and derivatives thereof) and one or more further ingredients. Whilst those further ingredients normally include one or more excipients, they may also optionally include one or more further active pharmaceutical or cosmetic agents (for example, an active pharmaceutical agent such as Miconazole).

The compositions according to the invention include those suitable for oral, parenteral (including subcutaneous, intradermal, intramuscular, intravenous, and intra-articular), inhalation (including fine particle dusts or mists which may be generated by means of various types of metered dose pressurized aerosols, nebulizers or insufflators), rectal and topical (including dermal, transdermal, transmucosal, buccal, sublingual, and intraocular) administration, although the most suitable route may depend upon, for example, the condition and disorder of the recipient.

The compositions may conveniently be presented in unit dosage form and may be prepared by any of the methods well known in the field of formulation. All methods include the step of bringing the active ingredient into association with the carrier which constitutes one or more accessory ingredients. In general the compositions are prepared by uniformly and intimately bringing into association the encapsulated particles with liquid carriers or finely divided solid carriers or both and then, if necessary, shaping the product into the desired formulation.

Compositions of the present invention suitable for oral administration may be presented as discrete units such as capsules, cachets or tablets each containing a predetermined amount of the active ingredient; as a powder or granules; as a solution or a suspension in an aqueous liquid or a non-aqueous liquid; or as an oil-in-water liquid emulsion or a water-in-oil liquid emulsion. The active ingredient may also be presented as a bolus, electuary or paste. Various pharmaceutically acceptable carriers and their formulation are described in standard formulation treatises, e.g., Remington's Pharmaceutical Sciences by E. W. Martin. See also Wang, Y. J. and Hanson, M. A., Journal of Parenteral Science and Technology, Technical Report No. 10, Supp. 42:2S, 1988, the contents of which are incorporated herein by reference.

A tablet may be made by compression or moulding, optionally with one or more accessory ingredients. Compressed tablets may be prepared by compressing in a suitable machine the active ingredient in a free-flowing form such as a powder or granules, optionally mixed with a binder, lubricant, inert diluent, lubricating, surface active or dispersing agent. Moulded tablets may be made by moulding in a suitable machine a mixture of the powdered compound moistened with an inert liquid diluent. The tablets may optionally be coated or scored and may be formulated so as to provide slow or controlled release of the active ingredient therein.

Exemplary compositions for oral administration include suspensions which can contain, for example, microcrystalline cellulose for imparting bulk, alginic acid or sodium alginate as a suspending agent, methylcellulose as a viscosity enhancer, and sweeteners or flavoring agents such as those known in the art; and immediate release tablets which can contain, for example, microcrystalline cellulose, dicalcium phosphate, starch, magnesium stearate and/or lactose and/or other excipients, binders, extenders, disintegrants, diluents and lubricants such as those known in the art. Molded tablets, compressed tablets or freeze-dried tablets are exemplary forms which may be used. Exemplary compositions include those formulating the present compound(s) with fast dissolving diluents such as mannitol, lactose, sucrose and/or cyclodextrins. Also included in such formulations may be high molecular weight excipients such as celluloses (avicel) or polyethylene glycols (PEG). Such formulations can also include an excipient to aid mucosal adhesion such as hydroxypropyl cellulose (HPC), hydroxypropyl methyl cellulose (HPMC), sodium carboxy methyl cellulose (SCMC), maleic anhydride copolymer (e.g., Gantrez), and agents to control release such as polyacrylic copolymer (e.g. Carbopol 934). Lubricants, glidants, flavors, coloring agents and stabilizers may also be added for ease of fabrication and use.

Compositions

Compositions of the invention for parenteral administration include aqueous and non-aqueous sterile injection solutions which may contain anti-oxidants, buffers, bacteriostats and solutes which render the composition isotonic with the blood of the intended recipient; and aqueous and non-aqueous sterile suspensions which may include suspending agents and thickening agents. The compositions may be presented in unit-dose or multi-dose containers, for example sealed ampoules and vials, and may be stored in a freeze-dried (lyophilised) condition requiring only the addition of the sterile liquid carrier, for example saline or water-for-injection, immediately prior to use. Exemplary compositions for parenteral administration include injectable suspensions of the encapsulated particles of the invention which can further contain, for example, suitable non-toxic, parenterally acceptable diluents or solvents, such as mannitol, 1,3-butanediol, water, Ringer's solution, an isotonic sodium chloride solution, or other suitable dispersing or wetting and suspending agents, including synthetic mono- or diglycerides, and fatty acids, including oleic acid, or Cremaphor. An aqueous carrier may be, for example, an isotonic buffer solution at a pH of from about 3.0 to about 8.0, preferably at a pH of from about 3.5 to about 7.4, for example from 3.5 to 6.0, for example from 3.5 to about 5.0. Useful buffers include sodium citrate-citric acid and sodium phosphate-phosphoric acid, and sodium acetate/acetic acid buffers. The composition preferably does not include oxidizing agents and other compounds that are known to be deleterious to any active ingredient. Excipients that can be included are, for instance, proteins, such as human serum albumin or plasma preparations. If desired, compositions may also contain minor amounts of non-toxic auxiliary substances, such as wetting or emulsifying agents, preservatives, and pH buffering agents and the like, for example sodium acetate or sorbitan monolaurate.

Exemplary compositions for nasal aerosol or inhalation administration include solutions in saline, which can contain, for example, benzyl alcohol or other suitable preservatives, absorption promoters to enhance bioavailability, and/or other solubilizing or dispersing agents such as those known in the art. Conveniently in compositions for nasal aerosol or inhalation administration the encapsulated particles of the invention may be delivered in a suitable powder inhaler. Capsules and cartridges of e.g., gelatin for use in such an inhaler can be formulated to contain a powder mix of the compound and a suitable powder base, for example lactose or starch.

Compositions for rectal administration may be presented as a retention enema or a suppository with the usual carriers such as cocoa butter, synthetic glyceride esters or polyethylene glycol. Such carriers are typically solid at ordinary temperatures, but liquefy and/or dissolve in the rectal cavity to release the drug.

Compositions for topical administration in the mouth, for example buccally or sublingually, include lozenges comprising the active ingredient in a flavoured base such as sucrose and acacia or tragacanth, and pastilles comprising the active ingredient in a basis such as gelatin and glycerine or sucrose and acacia. Exemplary compositions for topical administration include a topical carrier such as Plastibase (mineral oil gelled with polyethylene).

According to some embodiments a pharmaceutical composition of the invention is a unit dosage composition containing a single effective dose, or an appropriate fraction thereof, of the API or APIs (for example Miconazole).

It should be understood that in addition to the ingredients particularly mentioned above, the compositions of this invention may include other agents conventional in the art having regard to the type of composition in question, for example those suitable for oral administration may include flavouring agents.

The encapsulated particles of the invention (for example, encapsulated particles wherein the lipidic components are selected from amongst the fatty acid esters, such as stearyl heptanoate, stearyl caprylate, and derivatives thereof, and/or the regulator of metastable state is selected from one or more terpenes, terpenoids, and derivatives thereof) may also be suitably administered as sustained release systems. Suitable examples of sustained release systems of the invention include suitable polymeric materials, for example semi permeable polymer matrices in the form of shaped articles, e.g., films, or microcapsules; suitable hydrophobic materials, for example as an emulsion in an acceptable oil; or ion exchange resins; and sparingly soluble derivatives of the compound of the invention, for example, a sparingly soluble salt. Sustained release systems may be administered orally; rectally; parenterally; intracisternally; intravaginally; intraperitoneally; topically, for example as a powder, ointment, gel, drop or transdermal patch; buccally, sublingually; or as an oral or nasal spray.

A therapeutically effective amount of an API (for example, Miconazole) or a cosmetically effective amount of an ACI may be administered as a single pulse dose, as a bolus dose, or as pulse doses administered over time, for example during the course of a day, during the course of a week, or during the course of a month.

In many preferred embodiments (for example, when the encapsulated particles of the invention comprise an active pharmaceutical agent such as Miconazole) the composition of the invention is a topical cream or gel. For example, the composition of the invention may comprise a pharmaceutically compatible or a cosmetically compatible cream or gel suitable for topical application to the skin or another body surface, comprising a cream base in which encapsulated particles of the invention are suspended.

A pharmaceutically or cosmetically compatible cream comprises a cream base. Cream bases are typically emulsions of water in oil or oil in water. Preferably, they are oil in water emulsions, wherein the oil phase contains a mixture of lipids, sterols and emollients.

A pharmaceutically or cosmetically compatible gel comprises encapsulated particles of the invention (for example, encapsulated particles comprising an active pharmaceutical agent such as Miconazole) dispersed in the liquid phase of the gel. The gel is preferably a hydrogel (colloidal gel) comprising cross-linked polymers such as polyethylene oxide, polyacrylamides or agarose, methylcellulose, hyaluronan, elastin-like polypeptide, carbomer (polyacrylic acid), gelatin or collagen.

A composition of the invention may be in the form of an adhesive patch comprising a backing layer and an adhesive film wherein the adhesive film comprises encapsulated particles according to the invention or a cream or gel according to the invention.

A patch according to the invention is typically a transdermal patch and consists of a backing layer, which may be textile, polymer or paper and protects the patch from the outer environment; optionally a membrane, for example a polymer membrane which prevents migration of the fluorouracil through the backing layer; and an adhesive. The encapsulated particles may be provided in the adhesive layer or in a reservoir of the patch or a gel may act as a reservoir within the patch product (a so-called "monolithic" device).

A patch can be useful in ensuring the correct dosage of a subject by decreasing the likelihood of incautious or inappropriate use by the final user. Moreover, a patch will limit the area treated, avoiding inadvertent spreading to other areas.

A composition of the invention may be provided in a conveniently-packaged formed. For example, a composition of the invention may be provided in a box, tube, blister-pack or pump dispenser as appropriate.

According to a third aspect of the invention, there is provided a method of encapsulating particles of silicon-containing material comprising the steps of:

a) melting two or more waxy lipid substances (for example, stearyl heptanoate and stearyl octanoate) together;
b) mixing the melted waxy lipid substances with particle cores of hydrolysable silicon-containing material (for example, particle cores comprising white silicon);
c) adding to the mixture a warm aqueous solution containing, at least, a surfactant, a co-surfactant and a regulator of metastable state (for example, a regulator of metastable state selected from one or more terpenes, terpenoids and derivatives thereof) in order to obtain an emulsion; and
d) cooling the emulsion to a temperature below the melting point of the mixture of waxy lipid substances.

Such a method preferably encompasses the use of particle cores of silicon-containing material (such as particle cores comprising white silicon) to inhibit phase separation between the waxy lipids and the aqueous solution. As such, according to a seventh aspect of the invention, there is provided a method of inhibiting phase separation between a waxy lipidic phase (for example, a waxy lipidic phase comprising a mixture of fatty acid esters, such as a mixture of stearyl heptanoate and stearyl octanoate) of a pharmaceutical or cosmetic composition and an aqueous phase of said composition comprising adding particle cores of silicon-containing material (for example, particle cores comprising white silicon) to the composition during manufacture and optionally further components such as a surfactant, co-surfactant and regulator of metastable state. Preferably, the particles of silicon-containing material are added to the composition at a temperature above the melting point of the waxy lipidic substances and optionally subsequently cooling below that temperature.

The features described above in relation to, for example, the waxy lipid substances, the particles of silicon containing material, the surfactant, co-surfactant and regulator of metastable state may apply to certain preferred embodiments of the method of the invention, as may the presence of one or more APIs (such as Miconazole) and/or ACIs as described herein.

According to certain embodiments (for example, when the waxy lipidic phase comprises a mixture of fatty acid esters, such as a mixture of stearyl heptanoate and stearyl octanoate) the warm aqueous solution is at a temperature of below 100° C. but above the melting point of the waxy lipid substance having the highest melting point. For example the warm aqueous solution may be between 50° C. and 90° C., for between 40° C. and 75° C.

The method of the invention may optionally contain additional steps taking place before or after steps a) to d) above. For example, it may contain prior steps of preparing the particle cores (such as particle cores comprising white silicon) including the step of associating those cores with an API (such as Miconazole) or ACI, the step of increasing the porosity of the particle cores, the step of purifying or sorting (for example by size) the particle cores, or the step of activating or derivatising the particle cores to assist in the attachment or non-covalent association of an API/ACI. According to certain embodiments (for example, when the lipidic components are selected from amongst the fatty acid esters, such as stearyl heptanoate, stearyl caprylate, and derivatives thereof, and/or the regulator of metastable state is selected from one or more terpenes, terpenoids, and derivatives thereof) the silicon-containing particle cores may be derivatized with one or more amino acid (for example with arginine, glycine, proline or a mixture thereof).

The method of the invention may include steps taking place after steps a) to d) above. For example, the method may include recovering the encapsulated particles (for example, encapsulated particles wherein the lipidic components are selected from amongst the fatty acid esters, such as stearyl heptanoate, stearyl caprylate, and derivatives thereof, and/or the regulator of metastable state is selected from one or more terpenes, terpenoids, and derivatives thereof) from the aqueous solution, for example by freeze drying, air drying and/or filtration. If the encapsulated particles are already suitably sized (for example microparticles having a size disclosed elsewhere herein) then they may be ready for use or for formulation into a composition of the invention. In some embodiments however, they may need to be sorted for size or have their size reduced for example by milling.

The method of the invention may optionally include steps of formulating the encapsulated particles of the invention (for example, encapsulated particles wherein the lipidic components are selected from amongst the fatty acid esters, such as stearyl heptanoate, stearyl caprylate, and derivatives thereof, and/or the regulator of metastable state is selected from one or more terpenes, terpenoids, and derivatives thereof) into a composition of the invention, optionally having one of more features disclosed herein above. For example the method of the invention may include the step of mixing encapsulated particles formed in step d) or subsequent to step d) into a gel or cream base, or it may include the step of mixing the encapsulated particles with a muco-adhesive, and optionally using that muco-adhesive for making a transdermal patch. It may include mixing the encapsulated particles with carrier particles and loading them into a dosing device or mixing them with a hydrogel base in powder form and then, optionally including the step of hydration into a hydrogel, which may optionally be further processed into a transdermal patch device. The final steps of a method of the invention may include packaging, quality control testing and labelling steps. It may include the step of providing instructions for use or a product information text in association with a product of the invention, for example inserted in or printed on the outer packaging. Other optional steps include microbial sterilization (for example by gamma irradiation)

According to a fourth aspect of the invention, there is provided encapsulated particles according to the first aspect of the invention (for example, encapsulated particles wherein the lipidic components are selected from amongst the fatty acid esters, such as stearyl heptanoate, stearyl caprylate, and derivatives thereof, and/or the regulator of metastable state is selected from one or more terpenes, terpenoids, and derivatives thereof) or a composition according to a second aspect of the invention for use as a medicament. For example, the encapsulated particles for use as a medicament may comprise an API such as Miconazole.

Optionally, the medicament may be used in treating a subject in need of an API (for example, Miconazole) included in the encapsulated particles of the first aspect of the invention or included in the composition of the second aspect of the invention.

For example if the product of the invention includes an anti-inflammatory drug the medicament may be for use in treating or preventing inflammation, injury or pain.

If the product of the invention includes an immunosuppressive agents, the medicament may be for use in treating or preventing hypersensitivity, allergy, transplanted organ rejection, hayfever, pet allergy, allergic rhinitis or urticarial.

If the product of the invention includes an analgesics or antipyretics, the medicament may be used for treating or preventing pain or fever.

If the product of the invention includes an anti-fungal agent (for example, Miconazole) the medicament may be used for treating or preventing a fungal infection, for example Candidiasis, cryptococcal meningitis, athletes foot, tinea cruris (jock-itch) or cutaneous mycosis (such as fungal nail infection). The medicament may be used for treating or preventing dermatophytosis (ringworm), pityriasis, fungal vaginitis, or oropharyngeal Candidiasis.

If the product of the invention includes an anti-viral compound, the medicament may be used for treating or preventing a viral infection.

If the product of the invention includes an anti-parasitic compound, the medicament may be used for treating or preventing a parasitic infection or infestation.

If the product of the invention includes an antibacterial compound such as an antibiotic, the medicament may be used for treating or preventing a bacterial infection.

If the product of the invention includes an anti-neoplastic compound, the medicament may be used for treating or preventing a neoplastic condition such as cancer, in particular it may be used for treating a cancer of the skin or other body surface to which the product of the invention may be topically applied.

If the product of the invention includes an anaesthetic, the medicament may be used for inducing or sustaining a state of anaesthesia in a subject.

If the product of the invention includes a muscle relaxant, the medicament may be used for providing muscle relaxation in a subject, for example as a treatment for a spastic condition, a condition characterised by spasms, or for use as pre-medication prior to surgery.

If the product of the invention includes an antihypertensive agent, the medicament may be used for treating or preventing hypertension.

If the product of the invention includes an anti-anxiety agent, the medicament may be used for treating or preventing anxiety.

If the product of the invention includes a hormone, the medicament may be used to treat or prevent a condition caused by hormone deficiency such as a menopausal disorder, or diabetes, a growth disorder, hypogonadism, a thyroid disorder, or osteoporosis.

If the product of the invention includes a contraceptive agent, the medicament may be used to prevent pregnancy.

If the product of the invention includes an antidepressant, the medicament may be used to treat or prevent depression.

If the product of the invention includes an antiepileptic agent, the medicament may be used to treat or prevent epilepsy.

If the product of the invention includes a somnulant, the medicament may be used to treat or prevent insomnia.

If the product of the invention includes an antiemetic, the medicament may be used to treat or prevent nausea and/or vomiting.

If the product of the invention included an antipsychotic compound, the medicament may be used to treat or prevent psychosis.

If the product of the invention includes a spermicidal compound, the medicament may be used as a spermicide, optionally in combination with a barrier contraceptive device.

If the product of the invention includes an erectile dysfunction (ED) drug, the medicament may be used to treat or prevent erectile dysfunction and or male impotence.

In the product of the invention includes an ocular lubricant the medicament may be used to treat or prevent a dry eye condition.

If the product of the invention includes a laxative, the medicament may be used to treat or prevent constipation.

If the product of the invention includes a bile acid sequestrant or a bowel bulking agent or a serotonin agonist, the medicament may be used to treat or prevent diarrhoea.

If the product of the invention includes an appetite suppressant, the medicament may be used to treat or prevent obesity.

According to a fifth aspect of the invention, there is provided a method of treating a medical condition comprising administering an effective dose of one or more active pharmaceutical ingredients (APIs) such as Miconazole to a subject in need thereof, wherein the APIs are administered as a pharmaceutical composition according to an embodiment of the second aspect of the invention.

According to certain preferred embodiments of the fifth aspect of the invention, the medical condition is one of the medical conditions referred to above in reference to the fourth aspect of the invention (for example, dermatophytosis, cutaneous mycosis, pityriasis, fungal vaginitis, or oropharyngeal Candidiasis) and the API is optionally one of the pharmaceutically active agents referred to above in the context of treating or preventing a particular condition (for example, Miconazole).

According to a sixth aspect of the invention, there is provided a method of providing a cosmetic benefit to a subject comprising administering to said subject an encapsulated particle according to the first aspect of the invention (for example, encapsulated particles wherein the lipidic components are selected from amongst the fatty acid esters, such as stearyl heptanoate, stearyl caprylate, and derivatives thereof, and/or the regulator of metastable state is selected from one or more terpenes, terpenoids, and derivatives thereof) or a composition according to the second aspect of the invention.

According to preferred embodiments, the encapsulated particles (for example, encapsulated particles wherein the lipidic components are selected from amongst the fatty acid esters, such as stearyl heptanoate, stearyl caprylate, and derivatives thereof, and/or the regulator of metastable state is selected from one or more terpenes, terpenoids, and derivatives thereof) and/or compositions include one or more ACIs, for example one or more of the ACIs listed herein.

A method according to the sixth aspect of the invention may optionally provide a cosmetic benefit selected from skin hydration, skin softening, a reduction in the appearance of skin aging, a reduction in the appearance of age related skin spots, a reduction in unevenness of skin tone, skin whitening, a reduction in the prominence or scars, a reduction of skin redness, a reduction in the appearance of skin surface capillaries. Such a method preferably involves the administration of a topical composition to the skin.

Methods of the sixth aspect of the invention also include methods that provide a cosmetic benefit to the hair, nails and eye lashes. Such methods may optionally involve the administration to the subject of a composition which is, respectively, a shampoo or hair conditioner or tonic; a nail varnish or cream; or a mascara.

According to a seventh aspect of the invention, there is provided a method of inhibiting phase separation between a waxy lipidic phase of a pharmaceutical or cosmetic composition (for example, a waxy lipidic phase wherein the lipidic components are selected from amongst the fatty acid esters, such as stearyl heptanoate, stearyl caprylate, and derivatives thereof) and an aqueous phase of said composition, comprising adding particle cores of silicon-containing material (such as particle cores comprising white silicon) to the composition during manufacture and optionally further components selected from surfactants, co-surfactants and regulators of metastable state.

In accordance with such an aspect, the various compounds used in the method may, in certain embodiments be those described elsewhere in reference to the other aspects of the invention.

The present invention also provides, in further aspects, a composition for treating or preventing a fungal infection, for example Candidiasis (such as vaginal or oropharyngeal Candidiasis), cryptococcal meningitis, dermatophytosis such as tinea pedis (athlete's foot) or tinea cruris (jock itch) or cutaneous mycosis. The composition comprises a cream base and encapsulated particles prepared in accordance with the present invention. The encapsulated particles comprise 1-hexadecanol, stearyl heptanoate, stearyl caprylate, Miconazole, limonene and silicon particle cores (such as silicon nanoparticles). Preferably, the ratio of stearyl heptanoate to stearyl caprylate in the encapsulated particles is in a range of from 1:1 to 1:20, such as from 1:5 to 1:15, for example 1:9. Also contemplated are related methods of treating or preventing a fungal infection comprising treating a subject with said composition and further related uses and products.

Preparation of Silicon Containing Particle Cores

The silicon-containing particle cores relating to the invention may conveniently be prepared by techniques conventional in the art, for example by milling processes or by other known techniques for particle size reduction. The silicon-containing nanoparticles made from sodium silicate particles, colloidal silica or silicon wafer materials. Macro or micro scale particles are ground in a ball mill, a planetary ball mill, plasma or laser ablation methods or other size reducing mechanism. The resulting particles may be air classified to recover nanoparticles. It is also possible to use plasma methods and laser ablation for nanoparticles production.

Porous particles may be prepared by methods conventional in the art, including the methods described herein.

Encapsulation

The particles may be encapsulated by placing the particle cores in a molten lipidic components (preferably at no more than 30° C., 35° C., 37° C., 40° C. 45° C., 50° C. or 55° C.) and mixing. The lipidic components are then transformed into a powder by any suitable means, for example by solidifying and then milling or by emulsification and then solidification. The addition of a surfactant and co-surfactant may assist in emulsification.

Preparation of Creams and Gels

Creams and gels may be formulated simply by dispersing (i.e. mixing) the encapsulated particles with a cream or gel base. For example, the particles may be stirred into a pharmaceutical cream base. In respect of a gel, the powder may be stirred into the gel matrix in powder form and then the gel hydrated, or it may be stirred into a pre-hydrated gel.

Preparation of Patches

A patch may be formulated by any appropriate method, for example, a patch containing a muco-adhesive hydrophilic gel may be produced, the gel may be produced with the encapsulated particles of the invention, dispersed in it and the gel may optionally be dried by gentle evaporation of water to become a film with the required adhesive properties.

EXAMPLES

Silicon Preparation

Single-side polished P-type or N-type silicon wafers were purchased from Si-Mat, Germany. All cleaning and etching reagents were clean room grade. A heavily doped P pp type Si(100) wafer with a resistivity of 0.005 V cm-1 was used as the substrate. A 200-nm layer of silicon nitride was deposited by a low-pressure chemical vapour deposition system. Standard photolithography was used to pattern using an EVG 620 contact aligner. Porous nanoparticles were formed in a mixture of hydrofluoric acid (HF) and ethanol (3:7 v/v) by applying a current density of 80 mA cm-2 for 25 s. A high-porosity layer was formed by applying a current density of 320 mA cm-2 for 6 s in a 49% HF:ethanol mixture with a ratio of 2:5 (v/v). Smaller pores can be formed in a mixture of HF (49%) and ethanol (3:7 v/v) by applying a current density of 80 mA cm 22 for 25 s. In the specific case, pores were formed in a mixture of HF (49%) and ethanol (1:1 v/v) by applying a current density of 6 mA cm-2 for 1.75 min. After removing the nitride layer by HF, particles were released by ultrasound in isopropyl alcohol for 1 min. The shape, which is mainly hemispherical, is determined by means of scanning electron micrograph (SEM). The size of pores can be determined by means of nitrogen adsorption-desorption volumetric isotherms. After etching, the samples were rinsed with pure ethanol and dried under a stream of dry high-purity nitrogen prior to use.

Etched Silicon wafers, P+ or N− were crushed using a ball mill and/or pestle & mortar. The fine powder sieved using Retsch branded sieve gauge 38 μm and shaker AS200. Uniformity at the selected sizes (20-100 μm) is achieved by the aperture size of the sieve. The particle sizes were measured by the Quantachrome system and PCS from Malvern Instruments. Samples were kept in the closed container until further use.

Nanosilicon powder was also obtained from Sigma and Hefel Kaier, China. The particle size measured by PCS and recorded (size was range between 20-100 nm) before subjected to the loading and etching. Silicon wafers were crushed using a ball mill, or using mortar and pestle. The fine powder was sieved using a Retsch branded sieve gauge 38 μm and shaker AS200 and uniform nanoparticles of the desired size were collected.

Activation of Silicon Nanoparticles 250 mL of ethanol and 500 mg of 30-100 nm diameter porous silicon nanoparticles were mixed and stirred for 30 minutes. The solution was then centrifuged for 30 minutes at 3000 rpm. The supernatant was discarded and the nanoparticles washed in 5 mL of distilled water and transferred to a round bottomed flask. The contents of the flask were frozen (2 hours at −25° C.). The frozen nanoparticles were freeze-dried using a freeze dryer overnight. The resultant dry powder is the activated silicon nanoparticles.

Alternatively, 250 mL of methanol and 500 g of 30 nm diameter porous silicon nanoparticles was mixed and stirred for 120 minutes. The obtained paste was transferred onto trays for dehydration, in order to completely evaporate the organic solvent residue (24 hrs, room temperature). Once a solid thin layer was obtained, this layer was crushed and milled until a powder was obtained. The resultant dry powder is the activated silicon nanoparticles.

Effect of Silicon Particle Cores on Melting Points of Waxy Lipid Formulations

Three samples (P2, P5 and P10) were prepared. The samples are characterised in the table below.

| | P2 | P5 | P10 |
|---|---|---|---|
| Characteristics of silicon microparticles (SiMps) | 2 μm porous (white) SiMps embedded in waxy lipids | 5 μm porous (white) SiMps embedded in waxy lipids | 10 μm porous (white) SiMps embedded in waxy lipids |
| | Percentage by weight of each waxy lipid component | | |
| 1-hexadecanol | 60% | 60% | 60% |
| Octadecyl heptanoate:Octadecyl octanoate (1:9)* | 30% | 30% | 30% |
| Silicon microparticles | 10% | 10% | 10% |

*This component comprises a mixture of octadecyl heptanoate (HO) and octadecyl octanoate (OO) in a ratio by weight of 1:9 (HO:OO).

Preparation of Samples P2, P5 and P10

The samples were prepared according to the protocol below.

Materials 5 g 1-hexadecanol
  2.5 g of octadecyl heptanoate:octadecyl octanoate (in a 1:9 ratio by weight)
  0.83 g silicon microparticles
  1 g sodium bicarbonate The final microspheres have a nominal diameter of 45 μm, are white in colour, and comprise 10 wt % silicon microparticles.

Preparation of Mixture of Octadecyl Heptanoate and Octadecyl Octanoate (in a 1:9 Ratio by Weight of HO:OO)

1. Weigh 10 g octadecyl heptanoate into a glass jar;
2. Weigh 90 g octadecyl octanoate into the jar;
3. Close the lid of the jar and place it in a water bath at 40 to 50° C. until all the lipids are melted.
4. Remove the glass jar from the water bath and leave to cool at room temperature until the mixture has solidified.
5. Store the mixture at room temperature.

Preparation of P2, P5 and P10 Comprising 10 wt % Silicon Microparticles

1. Weigh 5 g of 1-hexadecanol into a tall 250 mL beaker (Beaker 1).
2. Weigh 2.5 g of the mixture of octadecyl heptanoate and octadecyl octanoate (HO:OO in a 1:9 ratio by weight) into Beaker 1.
3. Weigh 0.83 g of silicon microparticles (having a nominal diameter of 2 μm for P2; 5 μm for P5; or 10 μm for P10) into Beaker 1.
4. Boil 150 mL of distilled water in a separate beaker, Beaker 2 (using a hotplate).
5. Add approximately 1 g of sodium bicarbonate to Beaker 2, and stir to mix.
6. Melt the components in Beaker 1 using a hot plate, until a transparent/brownish oil is obtained.
7. Place ice cubes and acetone in a crystallizer, and place this under a Polimix (Polimix RW 20 stirrer equipped with a digital KCH-TRON spin counter; Kinematica, Littau/Lucerne Switzerland).
8. Transfer Beaker 1 (containing the oily phase) to the crystallizer. Carefully place the blades of the Polimix on the bottom part of Beaker 1.
9. Activate the Polimix (at 910/930 rpm) and immediately add the contents of Beaker 2 to the oily phase. After 1 to 2 minutes, set the rpm to 730. Stir and cool the beaker for 20 minutes, adding further ice externally to the crystallizer as needed.

10. Switch off the Polimix. Wash the blades with distilled water, and remove the beaker containing the microspheres suspended in water.
11. Filter the suspension and leave to dry for 5 to 6 days at room temperature (20° C.) to obtain a dry powder consisting of finished microspheres.

Differential Scanning Calorimetry

DSC analyses were performed using a DSC2500 TA Instrument. Samples P2, P5 and P10 (5 to 10 mg) were placed in aluminium pans. The samples were then hermetically sealed. Each sample was heated from 25° C. to 100° C., with a ramp speed of 10° C./min. The following results are normalized with respect to the weight of the samples. An empty aluminium pan was used as a control.

Thermograms were also obtained for each component (silicon microparticles; 1-hexadecanol; and the mixture of octadecyl heptanoate and octadecyl octanoate) individually.

Figure 2:
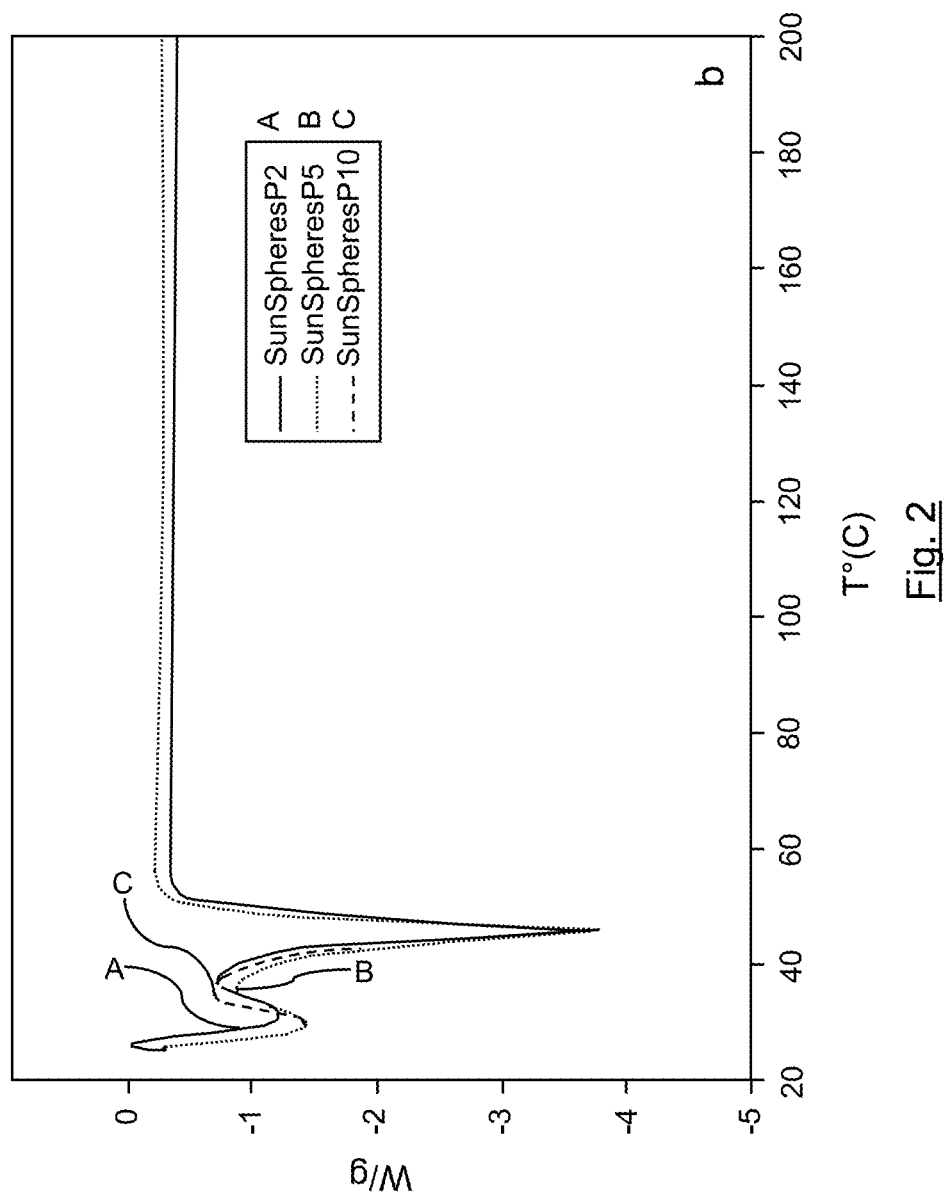
FIG. 2 shows thermograms (obtained by differential scanning calorimetry) for three different microsphere test samples prepared according to the invention. Sample P2 comprises silicon particle cores having a nominal diameter of 2 μm, sample P5 comprises silicon particle cores having a nominal diameter of 5 μm, and sample P10 comprises silicon particle cores having a nominal diameter of 10 μm.

FIG. 1 shows thermograms for each individual component, assessed separately by DSC, as well as the thermogram for P2. FIG. 2 shows thermograms for each sample P2, P5 and P10. All of P2, P5 and P10 display a strong peak at 45° C. A shoulder is also visible in the thermograms of P2, P5 and P10 at 30° C. Overall, formulating the waxy lipid components with silicon particle cores results in a marked change in the thermal behaviour of the components.

Biodegradability Assessment

The release of ortho silicic acid (OSA) from silicon microparticles (2 μm, 5 μm and 10 μm) and from samples P2, P5 and P10 (also 2 μm, 5 μm and 10 μm) was investigated.

The OSA release profile was determined by molybdenum blue assay and UV spectrophotometry [A range 600-800 nm].

Figure 3:
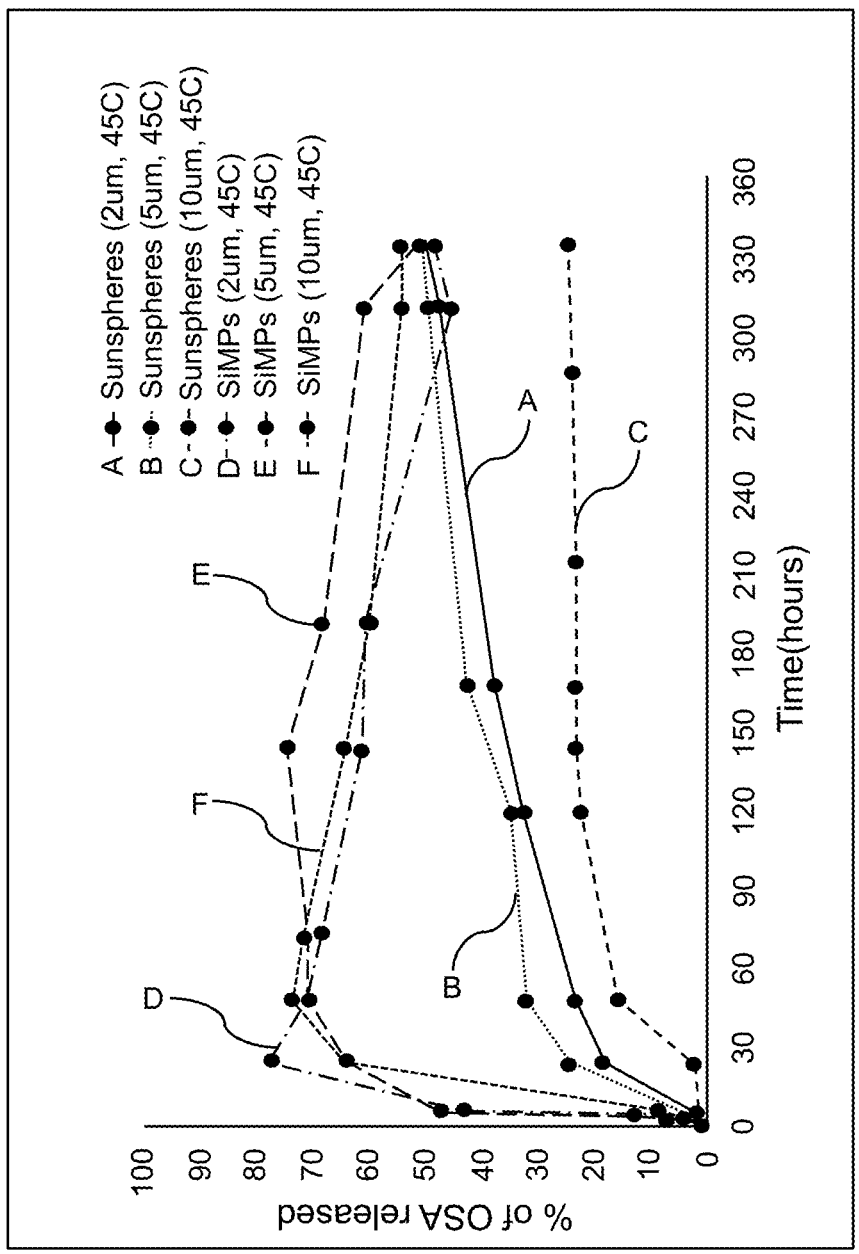
FIG. 3 shows the orthosilicic acid release profiles for silicon microparticles (having nominal diameters of 2, 5 and 10 μm) and samples P2, P5 and P10, at a pH of 7.4 and a temperature of 45° C.

FIG. 3 shows the OSA release profile for the silicon microparticles and samples P2, P5 and P10, at a pH of 7.4 and a temperature of 45° C. Overall, OSA is released more quickly by naked silicon microparticles that by samples P2, P5 and P10. It appears that the presence of the waxy lipid components delays the release of OSA, ensuring OSA is released in a controlled manner over time.

In Vitro Cytotoxicity Assessment of Silicon Microparticles by Indirect Cell Viability Assay Method The cytotoxicity of samples P2, P5 and P10 (as well as that of naked silicon microparticles) was evaluated by an indirect method (an extract method) on an AD293 cell line (a cell line derived from HEK293 human embryonic kidney cells). As a control sample, an "empty" waxy lipid formulation was prepared comprising hexadecyl decanoate, octadecyl decanoate and 1-hexadecanol.

The samples were incubated in a growth medium (Dulbecco's modified eagle medium, with 10% serum) at a concentration of 1 mg/mL for 24 h. Standard tissue culture conditions were used (37° C., 5% $CO_2$). In an extraction step following incubation, the sample solutions were filtered using a 0.2 μm syringe filter.

The extracted sample solutions (1 mg/mL) were diluted to three different concentrations (0.1, 0.075, and 0.05 mg/mL) in a culture medium. AD293 cells were then seeded at a density of $5 \times 10^4$ cells per well in a 24-well plate. These were incubated at 37° C. and 5% $CO_2$ for 24 h. Following this, the surrounding medium was removed and replaced with the silicon microparticle extracted solutions. The culture was then continued for a further 24 h. Finally, the viability of the cells was measured using a standard MTT assay. Every silicon microparticle sample tested was shown to not affect cell viability under the conditions (i.e. at concentrations of up to 0.1 mg/mL).

Morphological Analysis using Field Emission Scanning Electron Microscopy (FESEM) and Energy-Dispersive X-Ray Spectroscopy (EDS) Analysis The morphological characteristics of both "empty" waxy lipid formulations, and waxy lipid formulations loaded with silicon microparticles, were examined by field emission scanning electron microscopy using a JEOL JSM-7100F Thermal field emission electron microscope. Samples were mounted on SEM aluminium stubs using a graphite adhesive layer. The samples were gold-coated for 3 seconds at 75 mA before scanning. Size analysis on these images was performed manually using ImageJ software. The measurements are averaged across 25 solid lipid spheres (n=3).

Figure 4:
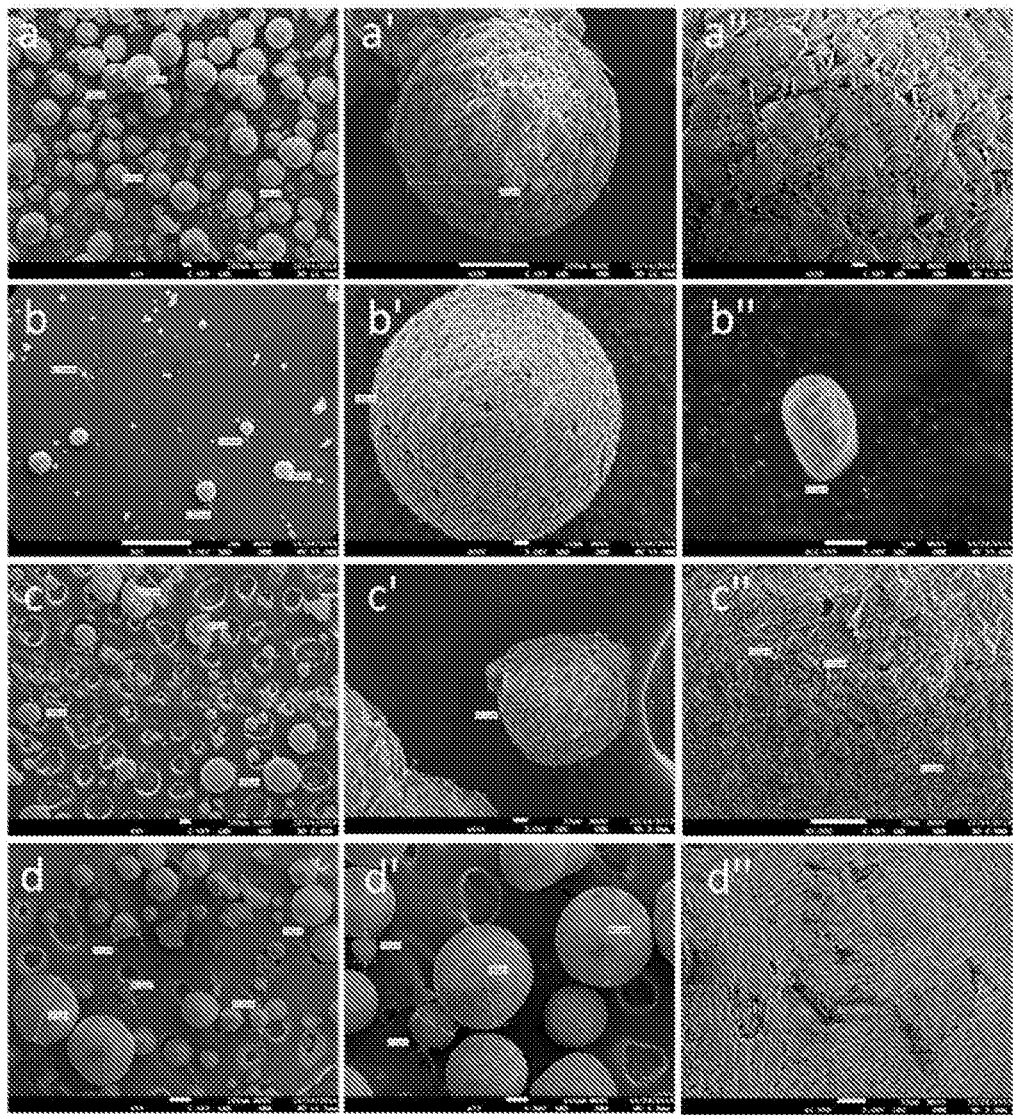
FIG. 4 shows scanning electron microscope images of: waxy lipid microspheres (formulated without silicon particle cores, a to a"); P2 waxy lipid microspheres formulated with silicon particle cores having a nominal diameter of 2 μm (b to b"); P5 waxy lipid microspheres formulated with silicon particle cores having a nominal diameter of 5 μm (c to c"); and P10 waxy lipid microspheres formulated with silicon particle cores having a nominal diameter of 10 μm (d to d").

The results are shown in FIG. 4. All samples show a roughly spherical shape, but the samples differ in surface texture. "Empty" waxy lipid formulations (labelled a, a' and a" in FIG. 4) display an irregular surface texture, which results from poor mixing of the lipid components.

In samples P2 (labelled b, b' and b" in FIG. 4) and P5 (labelled c, c' and c" in FIG. 4) the surface of the waxy lipids is coated with silicon microparticles. However, in sample P10 (labelled d, d' and d" in FIG. 4) a smooth surface is visible. It is inferred that in P10, total encapsulation of the silicon microparticles occurs, with few or no silicon microparticles embedded in the outer surface of the waxy lipid microsphere.

FIG. 4 also shows that all test samples (P2, P5 and P10) display a high level of polydispersity. Their sizes are shown in the table below.

Average Particle Size Determined by SEM Image Analysis

| Sample | Average nominal diameter (μm) |
| --- | --- |
| "Empty" waxy lipids | 284.5 ± 76.3 |
| P2 | 109.1 ± 92.8 |
| P5 | 153.4 ± 94.8 |
| P10 | 167.0 ± 97.7 |

Delivery of Miconazole Using Encapsulated Silicon Nanoparticle Cores

Miconazole is an antifungal drug, the structure of which is shown below:

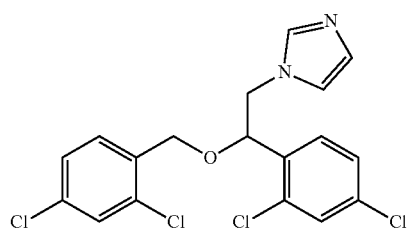 [SMILES: Clc1ccc(COC(Cn2ccnc2)c2ccc(Cl)cc2Cl)c(Cl)c1]

Miconazole is a weak base and shows poor aqueous solubility (<1 μg/mL). Due to its poor skin penetration capacity, it is typically difficult to administer Miconazole topically to treat cutaneous diseases. The composition of the present invention, comprising encapsulated silicon particle cores, should provide a delivery system for the effective topical application of Miconazole, and ensuring the controlled release of the drug to target areas.

Microspheres comprising waxy lipids and encapsulated silicon nanoparticle cores were prepared, loaded with Miconazole, according to the protocol below.

Preparation of Thermal Responsive Encapsulated Particles and Compositions Incorporating a Hydrophobic API—General Method a) Melt two or more lipidic substances together with the hydrophobic API at a temperature at least equal to the highest of their melting points;
b) Add silicon-containing particle cores;
c) Separately warm an aqueous mixture comprising deionized water, a surfactant and a co-surfactant to a temperature of less than 100° C.;
d) Optionally adjust pH as required by an addition of a salt or other suitable compound to the aqueous mixture.
e) Add the agent for regulating metastable state to the aqueous mixture;
f) Bring the lipidic mixture into contact with the aqueous mixture to obtain a micro-emulsion;
g) Optionally stir the emulsion in a cool environment (approx. 0 to 5° C.), for at least 15 min;
h) Filter the encapsulated particles of step f) The particles can be further rinsed and air-dried at room temperature for 48 hr, or an alternative method such as freeze-drying may be also used.

Encapsulated particles thus obtained can be directly dispersed into creams or gel.

Preparation of Solid Hydrophobic Microspheres Loaded with Miconazole—Specific Method 1. Weigh 0.20 g of Miconazole into a 250 mL beaker;
2. Weigh 1.20 g of 1-hexadecanol into the beaker;
3. Weigh 0.60 g of glyceryl monostearate derived ester, refined into the beaker;
4. Weigh 0.0002 g Silicon Nanoparticles.
5. Boil 200 mL of distilled water in a second beaker;
6. Add 0.005 mg of Merpol OJ surfactant (® Sigma-Aldrich), 0.5 g sodium bicarbonate and 2.0 mL of limonene to the water;
7. Melt the contents of the first beaker;
8. Cool a crystallizer, with ice cubes and acetone, and place it under the Polimix (Polimix RW 20 stirrer equipped with a digital KCH-TRON spin counter; Kinematica, Littau/Lucerne Switzerland), using a four-blade stain-less steel impeller (4.8 cm diameter);
9. Transfer the first beaker into the crystallizer—carefully place the blades of the Polimix on the bottom part of the beaker;
10. Activate the Polimix (650 rpm) and immediately add the boiling water
11. Stir and cool the beaker for 20 minutes adding externally further ice to the crystallizer as needed;
12. Switch off the Polimix. Wash the blades into the beaker with a small amount of ice-chilled distilled water. The beaker containing the encapsulated particles suspended in water;
13. Filter the suspension and leave the particles to dry at room temperature (20° C.).

Differential Scanning Calorimetry Analysis of Miconazole-Loaded Microspheres

DSC analyses were performed using a DSC2500 TA instrument. Microsphere samples loaded with Miconazole (5 to 10 mg) were placed in aluminium pans. The samples were then hermetically sealed. Each sample was heated from 25° C. to 100° C., with a ramp speed of 10° C./min. The following results are normalized with respect to the weight of the samples. An empty aluminium pan was used as a control.

The resulting thermograms show no peak corresponding to the melting point of Miconazole (83 to 87° C.). Instead, a single peak is observed circa 45 to 48° C. It is inferred that Miconazole is incorporated in the microspheres in an amorphous state. This stabilizes the drug, making it less prone to crystallization and resultant migration out of the formulation and loss over time. Thus, the microspheres of the invention should be capable of delivering a drug such as Miconazole in a sustained, controlled manner over time, for example when the formulation is applied topically to the surface of the skin. Moreover, the presence of a single peak (instead of multiple peaks, each representing the melting point of a given component) demonstrates the close interaction between the components of the microspheres (waxy lipids, silicon nanoparticle cores and Miconazole). The melting points of the individual components are shown in the table below.

Melting Points of Each Component of the Microsphere Formulation

| Name | Melting point |
| --- | --- |
| 1-Hexadecanol | 49.3° C. |
| Octadecyl heptanoate:Octadecyl octanoate (1:9 mixture) | 24-26° C. |
| Miconazole | 83-87° C. |
| Silicon nanoparticles | >500° C. |

Release Profile of Miconazole from Miconazole-Loaded Microspheres

The release of Miconazole from the Miconazole-loaded microsphere samples (comprising silicon nanoparticles and waxy lipids) was investigated at 45° C. in citric acid solution (pH 3). Samples were dispersed in 2 mL citric acid buffer in a dialysis bag. Each dialysis bag was placed in a beaker containing 50 mL citric acid buffer. The 50 mL buffer provides a release zone, from which 2 mL samples were taken at 0, 1, 2, 4, 6 and 20 hours. The release zone was replenished with 2 mL of fresh citric acid buffer after each measurement, in order to maintain a constant volume of buffer. The samples taken from the release zone were immediately analysed for their Miconazole content by UV spectrophotometry and high purity liquid chromatography.

After one hour, the microsphere samples released circa 40% of the loaded Miconazole. After 2 hours, circa 80% of the Miconazole had been released. After 4 hours, this had risen to circa 80%, after which there is a plateau in the release profile. This demonstrates the controlled release of Miconazole over time, due to the controlled melting of the microsphere formulations.

The experiment was repeated at 25° C. The rate of release of Miconazole over time was found to be significantly slower, with only 22 to 35% of the drug being released after six hours. As expected, the melting of the microsphere formulations occurs in an even slower and more controlled manner at this temperature, resulting in the particularly well-controlled release of the drug from the microspheres.

Morphological Analysis using Field Emission Scanning Electron Microscopy (FESEM) and Energy-Dispersive X-Ray Spectroscopy (EDS) Analysis The morphological characteristics of both "empty" microspheres (without Miconazole) and Miconazole-loaded microspheres were examined by field emission scanning electron microscopy using a JEOL JSM-7100F Thermal field emission electron microscope. Samples were mounted on SEM aluminium stubs using a graphite adhesive layer. The samples were gold-coated for 3 seconds at 75 mA before scanning.

Figure 5:
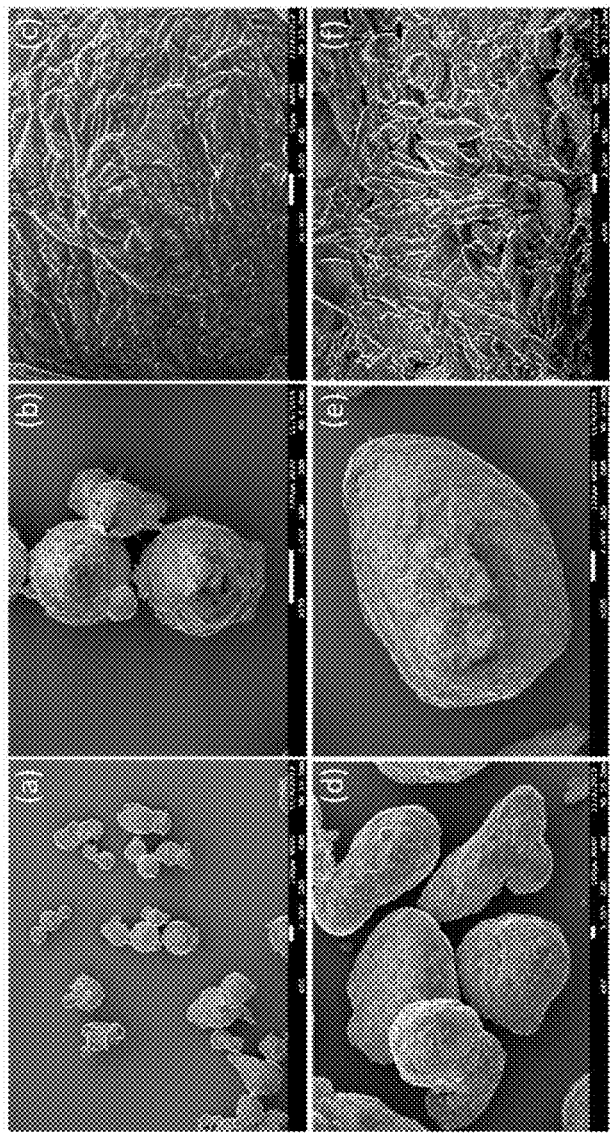
FIG. 5 shows scanning electron microscope images of microspheres (comprising waxy lipids and silicon particle cores) formulated without Miconazole (a to c) and with Miconazole (d to e).

As shown in FIG. 5, there is a significant difference in appearance between unloaded microspheres (labelled a, b and c in FIG. 5) and microspheres loaded with Miconazole (labelled d, e and f in FIG. 5). While unloaded microspheres appear roughly spherical and polydisperse, and have an average nominal diameter of 157.07±58 μm, Miconazole-loaded microspheres have an irregular shape and are significantly larger, with a nominal diameter of about 2 mm.

To assess whether Miconazole molecules had been successfully loaded in the microspheres, energy-dispersive X-ray spectroscopy (EDS) was used to determine the presence of chlorine atoms in the loaded formulations. Chlorine atoms are present in Miconazole (but in no other component of the microspheres). The EDS results suggest chlorine, and thus Miconazole, is indeed present in the loaded formulations.

Release of Miconazole from Miconazole-Loaded Microspheres Dispersed in Creams and Hydrogels Miconazole microspheres comprising 10 wt % of Miconazole were formulated in a cream base to obtain a final concentration of Miconazole of 1 wt %.

Composition of Microspheres Loaded with Miconazole

| Component | Amount | % by weight |
|---|---|---|
| 1-Hexadecanol | 14.4 g | 60% |
| Octadecyl heptanoate:Octadecyl octanoate (1:9 mixture) | 7.2 g | 30% |
| Miconazole | 2.4 g | 10% |
| Limonene | 1.8 g | ≤1% |
| Silicon | 0.006 g | 0.025% |

Composition of the Cream Base

| Component | Amount |
|---|---|
| Distilled water | 145.72 mL |
| Propylene glycol | 73.9 mL |
| Cetyl/Stearyl alcohol mixture | 66.42 g |
| Glycerol | 36.95 mL |
| PEG 400 | 22.14 mL |
| Coconut butter | 11.07 g |
| Brij 58 | 5.17 g |
| Hydroxyethylcellulose (HEM)' 90.000 Da | 5.54 g |
| EDTA sodium salt | 0.37 g |
| PVP-K90 | 0.37 g |
| Collagen | 0.37 g |
| Shea butter | 3.69 g |
| Vitamin E | 2.19 g |
| Trehalose | 1.1 g |
| Total amount | 375 |

The release profile of Miconazole from the microspheres in a cream base was investigated using a citric acid buffer at 45° C. The experiment was carried out in the same way as the experiment to determine the release profile of Miconazole from microspheres alone, see above. A control was provided comprising pure Miconazole mixed with cream base (without microspheres).

Figure 6:
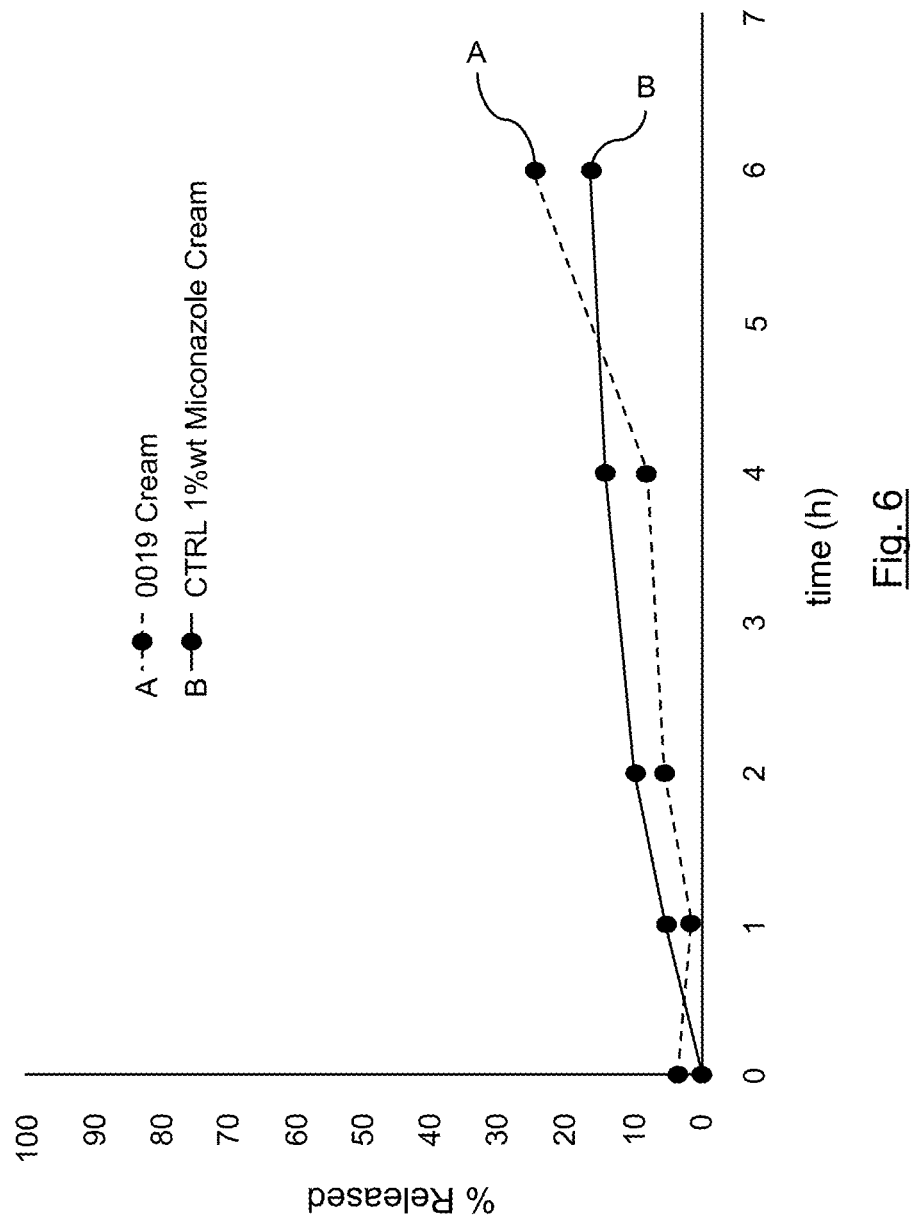
FIG. 6 shows the results of an experiment to determine the release profile of the drug Miconazole from two different samples over time. The control sample is a cream comprising pure (neat) Miconazole. The test sample is a cream comprising microspheres prepared according to the invention (comprising waxy lipids and silicon particle cores) wherein the microspheres are loaded with Miconazole, labelled 0019 cream.

The release profile of each formulation is shown in FIG. 6. The release profile of the cream comprising Miconazole-loaded microspheres shows a slower, more controlled rate of release than the control cream comprising pure (neat) Miconazole.

Pre-Clinical Tests: Cytotoxicity Studies

An in vitro study was performed to assess the cytotoxicity potential of the cream formulated with Miconazole-loaded microspheres. This cream will be referred to as cream 0019.

A direct contact test was used. Mouse cell line L929 was selected. The cytotoxicity of the product was determined by placing the test item on a monolayer of L929 cells (NCTC clone 929 [L cell, L-929 derivative of Strain L] (ATCC® CCL-1™), American Type Culture Collection (ATCC), Manassas, VA, USA). The cells were evaluated under the microscope.

After 24 hours, there was no sign of biological reactivity (Grade 0) in cells treated with the cream vehicle alone, nor in cells treated with a negative control. Severe reactivity (Grade 4) was observed in cells treated with a positive control. Severe signs of biological reactivity (Grade 4) were observed for the 0019 cream test article after 24 hours.

Overall, the test article, 0019 cream, is considered cytotoxic according to a direct cell contact test as defined in American National Standards Institute/Association for the Advancement of Medical Instrumentation/International Organization for Standardization (ANSI/AAMI/ISO) 10993-5-Biological evaluation of medical devices-Part 5: test for in vitro cytotoxicity.

Antimicrobial (Preservative) Effectiveness Tests (AET)

Antimicrobial (Preservative) effectiveness tests were performed in line with US Food and Drug Administration (FDA) standards, Cosmetic, Toiletry and Fragrance Association (CTFA) guidelines, United States Pharmacopeia (USP) testing procedures and other national guidelines. Nonsterile dosage forms of drugs typically have preservatives added to them in order to protect them from microbial contamination and the Antimicrobial Effectiveness Test (AET) is performed to gauge the performance of those preservatives.

The USP <51> antimicrobial effectiveness test, also known as the preservative efficacy test, is performed to determine if the chosen preservative is appropriate for a product formulation. It is also carried out as part of a stability study, to ascertain whether a preservative system is still effective up to the expiration date of a product.

To evaluate the antimicrobial effectiveness of a product, the product is inoculated with a prescribed quantity of specified microorganisms. The five USP AET test organisms are *C. albicans*, *S. aureus*, *E. coli*, *P. aeruginosa*, and *A. brasiliensis*. The effectiveness of the preservative is evaluated by monitoring the level of microorganisms in the test sample at pre-determined time intervals over a period of 28 days at a specified temperature. The reduction of microorganisms is recorded using a logarithmic scale.

It was found that the 0019 cream meets the requirements of the USP <51> category II antimicrobial preservatives effectiveness test, indicating that the 0019 cream is suitable for human application.

The 0019 cream was also assessed using the USP <61> criteria. This test quantifies the growth of mesophilic bacteria and fungi under aerobic conditions. The results are shown in the table below.

| | |
|---|---|
| With bacteria | Not less than 2.0 log reduction from the initial count at 14 days, and no increase from the 14 days' count at 28 days. |
| With yeast and moulds | No increase from the initial calculated count at 14 and 28 days. |

Leporine Vaginal Irritation Test

A vaginal irritation test was performed on rabbits to determine the vaginal irritation likely to arise from repeated exposure to the 0019 cream. The test was performed according to FDA standards.

The test was conducted using New Zealand White (NZW) albino female rabbits. A control group (Group 1, n=3) and test group (Group 2, n=3) were provided. 0019 cream (1 mL) was administered intra-vaginally via a round-tipped gavage needle once daily for a five day period to test subjects. Saline solution (1 mL) was administered in like manner to control subjects. All animals were monitored for backflow and/or discharge of the cream. The vulva was also monitored and the rabbits' cage trays were observed for signs of cream leakage.

All animals were observed for mortality, signs of gross toxicity and behavioural changes at least once daily for a period of six days. In addition, the vulva and surroundings tissue were evaluated for erythema and discharge or other evidence of vaginal irritation. Individual vaginal irritation was measured once daily prior to each intra-vaginal administration, and, on the sixth day, prior to necropsy.

At the end of the study, all control and test subjects were euthanized. The entire vagina was then excised, examined and scored for discharge, edema, and erythema, before being preserved in 10% neutral buffer formalin. Histological examination of the vagina was performed and graded according to a pre-defined scoring system. The scores for the microscopic evaluation for all subjects were divided by the number of observations to obtain an overall test group average.

All animals survived administration and appeared active and healthy during the study. Body weights were comparable between the control and test groups. Vaginal erythema and discharge scores and swelling/infection were comparable between the control and test groups. No epithelial changes were evident in the vaginal tissue of control subjects.

Grade 1 to 3 epithelial changes were evident in all the sections of vaginal mucosa from one test subject. Grade 1 leukocyte infiltration was evident in at least one vaginal section from two test subjects. Grade 1 vascular congestion was evident in at least one vaginal section from one test subject, while Grade 4 vascular congestion with haemorrhage was evident in one vaginal section from one control subject. Grade 1 to 4 edema was evident in one test subject.

The average irritation score for the control group was 1.0. No background changes or evidence of application trauma was observed for the control group. The average irritation score for the test group was 4.0. This average score of 4.0 appears to be somewhat distorted by the score of a single test subject (Animal 4304) since this test subject experienced microscopic lesions. The Irritation Index for the 0019 cream was 3.0. While this value may suggest that the 0019 cream is a minimal irritant, it is more likely that the dominant score of a single test subject (Animal 4304) is responsible for the difference between the test and control groups, for which there may be an unrelated background cause.

Under the conditions of this study, 0019 cream is considered a minimal vaginal irritant in New Zealand White rabbits.

Repeat Insult Patch Test to Determine Skin Irritation/Sensitization in Human Subjects (Occlusive Patch Test)

Human dermal trials were carried out according to FDA standards to determine the safety of the 0019 cream (1% wt Miconazole). Skin irritation/sensitization was assessed by Repeat Insult Patch Test (RIPT). 0019 cream (0.2 mL) was dispensed directly onto the skin and allowed to air-dry. This was repeated three times daily, on three days per week, for a period of three weeks (with nine patches being applied in total). Subjects then had a 10 to 14-day rest period, before further application of the 0019 cream and assessments at a further 24 and 48-hour period.

The scoring system was as follows:
0—No evidence of any effect
1—(Barely perceptible) minimal faint (light pink) uniform or spotty erythema
2—(Mild) pink uniform erythema covering most of contact site
3—(Moderate) pink/red erythema visibly uniform in entire contact area
4—(Marked) bright red erythema with accompanying edema petechiae or papules
5—(Severe) deep red erythema with vesiculation or weeping with or without edema.

All 52 test subjects scored Zero (0). No adverse effects of any kind were observed for the 0019 cream (1% wt Miconazole).

The invention claimed is:

1. Encapsulated particles comprising one or more particle cores of hydrolysable silicon-containing material, the one or more particle cores comprising at least 50% by weight elemental silicon; and an active pharmaceutical ingredient (API) present at between 0.1% and 20% by weight of the total encapsulated particle weight, wherein the API is an anti-fungal agent; wherein the one or more particle cores are encapsulated in a waxy lipid shell comprising:
   a) two lipidic components present at from 55% to 95% of the total encapsulated particle weight;
   b) a surfactant present at from 0.1% to 5% by weight of the total encapsulated particle weight;
   c) a co-surfactant present at from 0.01% to 1% by weight of the total encapsulated particle weight; and
   d) a regulator of metastable state present at from 0.1% to 5% by weight of the total encapsulated particle weight, wherein the regulator of metastable state is selected from one or more of: terpenes; terpenoids; $C_{14}$ to $C_{22}$ fatty acids, pegylated by methyl ether of polyethylene glycol (PEG); diacylphosphatidylethanolamines pegylated with PEG; poloxamers; and derivatives thereof.

2. Encapsulated particles according to claim 1, wherein the API is miconazole, griseofulvin, fluconazole, itraconazole, oxiconazole, econazole, or bifonazole.

3. Encapsulated particles according to claim 2, wherein the API is miconazole.

4. Encapsulated particles according to claim 1, wherein the API is a hydrophilic compound, less than 10% of which is present in the waxy lipid shell.

5. Encapsulated particles according to claim 1, wherein the API is a lipophilic compound, at least 90% of which is present in the waxy lipid shell.

6. Encapsulated particles according to claim 1, comprising a first and a second active pharmaceutical ingredient (API), each present at between 0.1% and 20% by weight of the total encapsulated particle, wherein the first API is hydrophilic and less than 10% of it is present in the waxy lipid shell and the second API is lipophilic and at least 90% of it is present in the waxy shell.

7. Encapsulated particles according to claim 1, comprising at least three waxy lipid compounds as lipidic components.

8. Encapsulated particles according to claim 1, wherein the lipidic components are selected from the group consisting of esters of triacontanol and/or glyceryl monostearate with $C_8$ to $C_{22}$ acid chlorides; triglycerides; diglycerides; $C_{12}$ to $C_{22}$ fatty acids, and their esters with polyalcohols; stearyl alcohol, capric alcohol, lauric alcohol, myristic alcohol, palmitic alcohol, and stearic alcohol acid chlorides; cholesterol and its esters; phospholipids; sterols; cerebrosides; and natural and mineral waxes.

9. Encapsulated particles according to claim 1, wherein the lipidic components are selected from the group consisting of octadecanoic (stearyl) acid chloride, decanoic (capric) acid chloride, dodecanoic (lauric) acid chloride, tetradecanoic (myristic) acid chloride, hexadecanoic (palmitic) acid chloride, octadecanoic (stearic) acid chloride; trilaurin, tricapriloin, tristearin, tripalmitin; dipalmitin and distearin; lauric acid, myristic acid, palmitic acid and stearic acid; esters of lauric acid, myristic acid, palmitic acid and stearic acid with propylene glycol; lauryl alcohol, myristic alcohol, cetyl alcohol, stearyl alcohol; cholesterylpalmitate, cholesterylbutyrate and cholesterylbenzoate, and esters thereof; phospholipids, sterols and cerebrosides; beeswax, spermaceti, carnauba wax, candelilla wax and ouricury wax.

10. Encapsulated particles according to claim 1, wherein the lipidic components comprise a mixture of stearyl heptanoate and stearyl octanoate.

11. Encapsulated particles according to claim 10, wherein the ratio by weight of stearyl heptanoate to stearyl octanoate is from 1:1 to 1:20.

12. Encapsulated particles according to claim 1, incorporating one or more of the following further features:
  i) the surfactant is a compound selected from the group consisting of sodium cholate, sodium deoxycholate, sodium glycocholate, sodium taurocholate, sodium tauro-deoxycholate, lecithin, phospholipids and their hydrogenated forms, polysorbates 20, 40, 60, 80, 85, sorbitans 20, 40, 60, 80, emulsifiers, and mixtures of any thereof,
  ii) the co-surfactant is a compound selected from the group consisting of bile salts, alcohols, and glycols, fatty acids, esters of phosphoric acid, benzyl alcohol, and mixtures of any thereof,
  iii) the regulator of metastable state is a compound selected from the group consisting of hemiterpenes, and related oxygen-containing derivatives; monoterpenes; sesquiterpenes; diterpenes; triterpenes, and tetraterpenes and their derivatives thereof; dipalmitoyl phosphatidylethanolamine-PEG, PEG-stearate, $C_{14}$ to $C_{22}$ fatty acids pegylated by methyl ether of polyethylene glycol (PEG), diacylphosphatidylethanolamines pegylated with PEG, poloxamers, and mixtures of any thereof.

13. Encapsulated particles according to claim 12, incorporating one or more of the following features:
  i) the co-surfactant is a compound selected from the group consisting of sodium taurocholate, butanol, hexanediol, propylene glycol, hexanol, butyric acid, and caproic acid,
  ii) the regulator of metastable state is a compound selected from the group consisting of prenol, isovaleric acid, geraniol, terpineol, limonene, myrcene, linalool, pinene, iridoids, farnesenes, farnesol, humulene, cafestol, kahweol, cembrene, taxadiene, retinol, retinal, phytol, and mixtures of any thereof.

14. Encapsulated particles according to claim 1, wherein the surfactant is 1-hexadecanol.

15. A composition comprising encapsulated particles according to claim 1, and one or more further ingredients.

16. The composition according to claim 15, comprising one or more of the following further features:
  i) the composition is a pharmaceutical composition,
  ii) the composition is a topical composition,
  iii) the composition is a cream, gel or micro-adhesive patch.

17. A method of treating a medical condition comprising administering an effective dose of one or more active pharmaceutical ingredients (APIs) to a subject in need thereof, wherein the APIs are administered as a pharmaceutical composition according to claim 16.

18. The method of claim 17, wherein the medical condition is a fungal infection.

19. The method of claim 18, wherein the fungal infection is Candidiasis, cryptococcal meningitis, athlete's foot, tinea cruris, cutaneous mycosis, dermatophytosis, pityriasis, or fungal vaginitis.

20. The method of claim 18, wherein the API is miconazole, griseofulvin, fluconazole, itraconazole, oxiconazole, econazole, or bifonazole.

21. Encapsulated particles according to claim 1, wherein the surfactant is a non-ionic surfactant.

22. Encapsulated particles according to claim 1, comprising:
  i) two lipids, wherein the lipids are stearyl heptanoate and stearyl octanoate;
  ii) a non-ionic surfactant;
  iii) the co-surfactant is 1-hexadecanol; and
  iv) the regulator of metastable state is limonene.

23. Encapsulated particles according to claim 22, wherein the non-ionic surfactant is non-ionic alcohol ethoxylate surfactant.

24. Encapsulated particles according to claim 22, containing one API; wherein the one API is miconazole, which is a lipophilic compound; and at least 90% of the API is present in the waxy lipid shell.

* * * * *